United States Patent
Taketsuna

(10) Patent No.: US 7,919,890 B2
(45) Date of Patent: Apr. 5, 2011

(54) ROTATING ELECTRIC MACHINE

(75) Inventor: Yasuji Taketsuna, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 317 days.

(21) Appl. No.: 11/793,401

(22) PCT Filed: Jan. 10, 2006

(86) PCT No.: PCT/JP2006/300414
§ 371 (c)(1),
(2), (4) Date: Jun. 18, 2007

(87) PCT Pub. No.: WO2006/085429
PCT Pub. Date: Aug. 17, 2006

(65) Prior Publication Data
US 2007/0278869 A1  Dec. 6, 2007

(30) Foreign Application Priority Data
Jan. 17, 2005  (JP) .................... 2005-009219

(51) Int. Cl.
*H02K 9/19* (2006.01)
*H02K 3/24* (2006.01)

(52) U.S. Cl. .................. 310/54; 310/43; 310/254.1

(58) Field of Classification Search ............. 310/43, 310/54, 254, 52, 58
See application file for complete search history.

(56) References Cited

U.S. PATENT DOCUMENTS

| | | | | |
|---|---|---|---|---|
| 3,060,335 A | * | 10/1962 | Greenwald ............ | 310/54 |
| 3,084,418 A | * | 4/1963 | Procopio ............ | 264/262 |
| 4,959,570 A | * | 9/1990 | Nakamura et al. ....... | 310/54 |
| 5,372,213 A | | 12/1994 | Hasebe et al. | |
| 5,670,838 A | * | 9/1997 | Everton ............ | 310/216.061 |
| 5,955,804 A | * | 9/1999 | Kusase et al. ......... | 310/59 |
| 5,996,209 A | * | 12/1999 | Molnar et al. ......... | 29/596 |
| 6,169,344 B1 | * | 1/2001 | Tsuruhara ............ | 310/58 |
| 6,515,384 B1 | * | 2/2003 | Kikuchi et al. ........ | 310/58 |
| 6,617,716 B2 | * | 9/2003 | Ishida ............... | 310/58 |
| 6,657,331 B2 | * | 12/2003 | Asao et al. .......... | 310/54 |
| 2005/0151429 A1 | | 7/2005 | Taketsuna et al. | |

FOREIGN PATENT DOCUMENTS

| | | | |
|---|---|---|---|
| EP | 980132 | * | 2/2000 |
| EP | 1542336 | * | 6/2009 |
| JP | U 60-156860 | | 10/1985 |
| JP | 64-30441 | * | 1/1989 |
| JP | 01-283042 | * | 11/1989 |
| JP | A 4-364343 | | 12/1992 |
| JP | A 5-169985 | | 7/1993 |
| JP | A 5-284691 | | 10/1993 |
| JP | 07-075271 | * | 3/1995 |
| JP | 08-009595 | * | 1/1996 |
| JP | 09-093869 | * | 4/1997 |
| JP | 10-051989 A | * | 2/1998 |
| JP | 2000-116061 | | 4/2000 |
| JP | A 2000-197311 | | 7/2000 |
| JP | A 2002-272041 | | 9/2002 |
| JP | A 2003-224945 | | 8/2003 |
| JP | A 2003-289650 | | 10/2003 |
| JP | A 2004-48877 | | 2/2004 |
| JP | A 2004-215353 | | 7/2004 |
| JP | A 2004-257594 | | 9/2004 |
| JP | A 2004-357458 | | 12/2004 |
| JP | 2005-269786 | * | 9/2005 |
| WO | WO 2004/019468 A1 | | 3/2004 |

\* cited by examiner

*Primary Examiner* — Burton Mullins
(74) *Attorney, Agent, or Firm* — Oliff & Berridge, PLC

(57) ABSTRACT

A rotating electric machine, comprising a stator, a rotor, a case storing the stator and the rotor, and an oil pump. Oil discharge ports are formed at the terminal part of an oil discharge passage of the case, and a cooling oil is supplied to the upper cutout parts of the stator. A groove part is covered by a cover to form a closed flow passage. Since the cooling oil is sufficiently applied to the portion of a coil exposed to the inside of the flow passage, a cooling efficiency is increased. Also the cooling oil is guided to an orifice on the lower side in the gravitational direction. Accordingly, since the cooling oil does not flow in an air gap between the rotor and the stator, a power loss can be prevented from occurring.

6 Claims, 19 Drawing Sheets

ROTATING ELECTRIC MACHINE

TECHNICAL FIELD

The present invention relates to a rotating electric machine and, more specifically, to a rotating electric machine having a cooling flow passage through which fluid for cooling flows.

BACKGROUND ART

In order to rotate a rotating electric machine (a motor, a generator or a motor-and-generator) under severe load conditions or to reduce the size of the rotating electric machine, it is necessary to quickly radiate heat generated at a coil or a stator core. If the temperature of a stator increases, enamel coating of an enamel line of the coil or insulating paper insulating the coil from the stator could be burned out.

Recently, vehicles using a rotating electric machine as a driving source together with or in place of an engine, such as an electric vehicle, a hybrid vehicle and a fuel cell vehicle have been introduced. Particularly heavy requirements of driving under severe load conditions and size reduction are imposed on the rotating electric machine mounted on such a vehicle.

In the conventional art, a technique of directly applying cooling liquid to a coil winding portion to lower coil temperature and to prevent burnout of the enamel coating or insulating paper has been known. By way of example, a cooling liquid supply port is provided at an upper portion of a case housing the rotating electric machine, and the cooling liquid is sprayed to the coil through the cooling liquid supply port for cooling the coil.

When the cooling liquid is supplied to the coil and then let fall by gravitation, only about 30 to about 60% of the outer surface area of the coil could actually be covered with the cooling liquid, and the remaining portions of the coil surface are not wet by the cooling liquid but are cooled with air. Therefore, though the coil temperature becomes lower than when the entire surface area of the coil is cooled with air, the coil temperature increases in a range of severer driving conditions (high speed range or large torque range).

Japanese Patent Laying-Open Nos. 2002-272041, 4-364343, 2003-289650 and 2003-224945 disclose a rotating electric machine having a closed type cooling flow passage provided on an end surface of a coil winding portion of a stator. Such a structure improves the effect of cooling the coil than when the cooling liquid is simply sprayed to the coil and the liquid flows down as determined by gravitation.

In the structure disclosed in the prior art references such as Japanese Patent Laying-Open No. 2002-272041, however, the cooling liquid is supplied from an upper portion of the rotating electric machine and discharged at a lower portion. In such a structure, if the supply of cooling liquid is insufficient, the cooling liquid may locally fail to contact even with the portion on the coil winding end surface, and hence, cooling performance is not satisfactory.

DISCLOSURE OF THE INVENTION

An object of the present invention is to provide a rotating electric machine having improved cooling capability.

In summary, the present invention provides a rotating electric machine, including: a stator core; a coil wound around the stator core; a cooling flow passage arranged such that at least a portion of the coil wound around the stator core is dipped in a fluid for cooling; and a flow rate control unit for controlling a quantity of supply or quantity of discharge of the fluid so that the cooling flow passage is appropriately filled with the fluid.

Preferably, in the cooling flow passage, a fluid supply port is provided on an upper side of the stator core, and a fluid discharge port is provided on a lower side of the stator core. The flow rate control unit includes a flow rate control valve attached to the fluid discharge port.

Preferably, a detecting unit for detecting a state of the rotating electric machine is provided. The flow rate control unit changes coil dipping level of the fluid filled in the cooling flow passage in accordance with an output from the detecting unit.

Preferably, the rotating electric machine further includes a resin mold portion fixing the coil on a stator.

According to another aspect, the present invention provides a rotating electric machine, including: a stator core; a coil wound around the stator core; and a cooling flow passage arranged such that at least a portion of the coil wound around the stator core is dipped in a fluid for cooling. In the cooling flow passage, a fluid supply port is provided on a lower side of the stator core and a fluid discharge port is provided on an upper side of the stator core.

More preferably, the rotating electric machine further includes a check valve attached to the fluid supply port.

Preferably, the fluid discharge port is provided at a position allowing the fluid discharged from the fluid discharge port to be fed to a space between the stator core and a case accommodating the stator core.

Preferably, the rotating electric machine further includes a resin mold portion fixing the coil on a stator.

According to the present invention, as a closed flow passage is adopted, a larger portion of coil comes to be in contact with the cooling fluid, so that heat transfer area between the cooling oil and the coil increases, heat resistance between the coil and the cooling oil can significantly be reduced, and more efficient cooling of the motor becomes possible.

Further, as the heat radiating path allows direct heat radiation from the coil to the cooling oil, heat resistance between the coil and the cooling oil can significantly be reduced, and efficient cooling of the motor becomes possible.

BEST MODES FOR CARRYING OUT THE INVENTION

Figure 1:
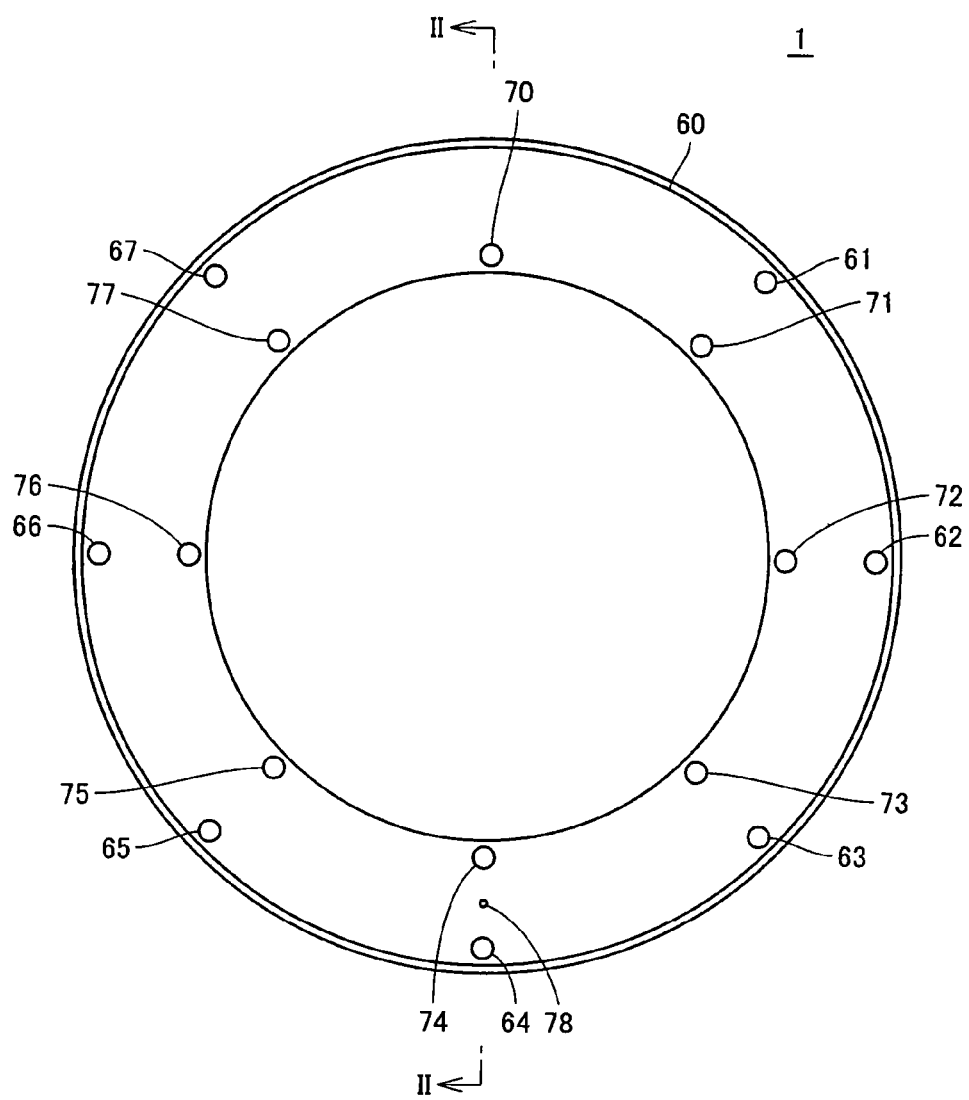
FIG. 1 is a front view of a stator 1 used in Embodiment 1 of the present invention.

In the following, embodiments of the present invention will be described in detail with reference to the figures. The same or corresponding portions are denoted by the same reference characters and description thereof will not be repeated.

Embodiment 1

Embodiment 1 proposes a motor cooling structure that allows operation under severe load conditions and allows reduction in size of a motor in which a coil portion of a stator is molded, by directly liquid-cooling the coil.

FIG. 1 is a front view of a stator 1 used in Embodiment 1 of the present invention.

Figure 2:
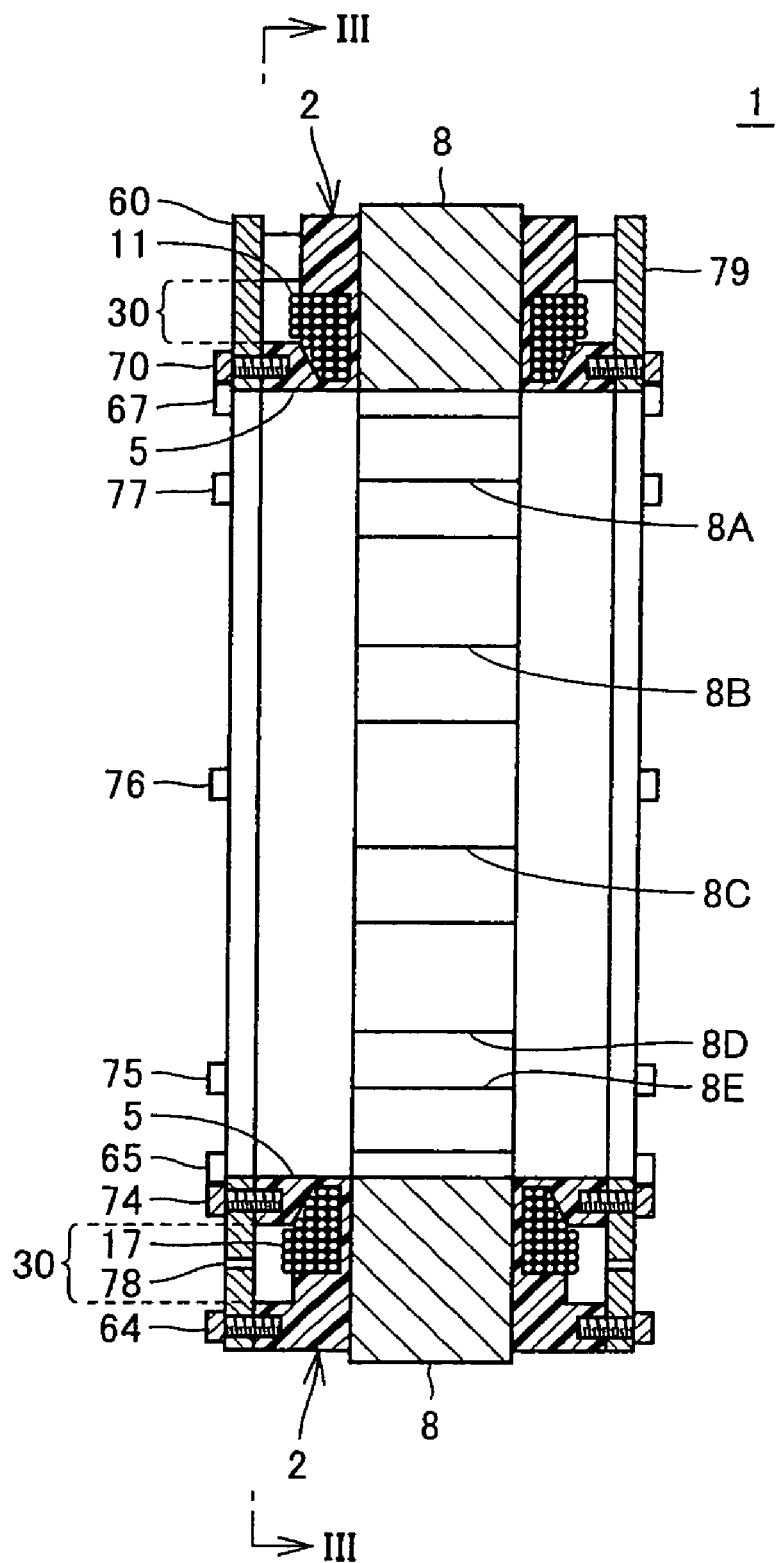
FIG. 2 is a cross-sectional view taken along the line II-II of FIG. 1.

FIG. 2 is a cross-sectional view taken along the line II-II of FIG. 2.

Referring to FIGS. 1 and 2, stator 1 has a cylindrical shape accommodating a rotor therein, and includes covers 60 and 79 on opposite side surfaces. Cover 60 is fixed on a mold resin portion 2 of the stator by means of bolts 61 to 67 arranged on an outer circumferential side and bolts 70 to 77 arranged on an inner circumferential side.

Figure 3:
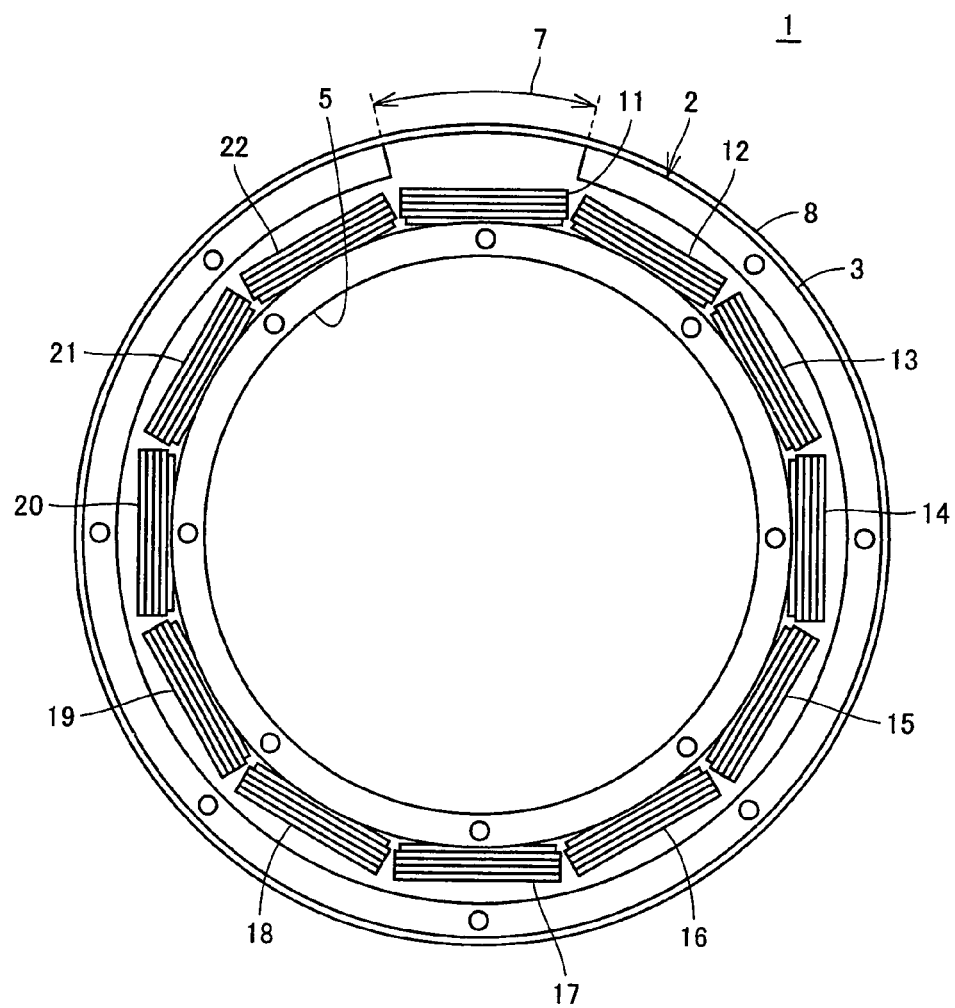
FIG. 3 is a view taken from the direction of III-III of FIG. 2 with a cover 60 removed.

FIG. 3 is a view corresponding to FIG. 2, taken along the direction of III-III, with cover 60 removed.

Referring to FIGS. 2 and 3, stator 1 includes a stator core 8, coils 11 to 22 wound around core portions of stator core 8, respectively, and a resin portion 2 having an annular shape containing rotor therein, and fixing and supporting coils 11 to 22 on stator core 8 by resin molding.

FIG. 3 shows the up/down cross-section and a cylindrical inner side surface of the stator. On the cylindrical inner side surface, head portions of stator cores 8A to 8E are visible.

On that surface of resin portion 2 which is perpendicular to the rotor and the rotation shaft, a groove 30 is provided for guiding cooling oil toward coils 11 to 22. Groove 30 is formed by wall portions 3 and 5 that protrude from resin portion 2. In a hybrid vehicle, it is common to use ATF (Automatic Transmission Fluid) as the cooling oil.

From the inner wall of groove 30, portions of coils 11 to 22 are exposed, not buried in the resin portion. The exposed portion is a coil portion wound around stator core 8, on the front side of rotation shaft. As the cooling oil directly touches the coil, heat of the coil can easily be transferred to the cooling oil, whereby improved cooling efficiency can be attained.

Groove 30 has an annular shape, and on the wall portion of resin portion 2 forming the groove 30, a cutout portion 7 for letting in the cooling oil and a cutout portion 6 for letting out the cooling oil are provided. Cutout portion 7 is set to be larger than cutout portion 6, whereby the cooling oil tends to be pooled at the lower potion of the groove, and the coils tend to be dipped in the cooling oil. Thus, cooling efficiency can further be improved.

The stator core is set to the coils and then inserted to a forming mold, and by injection molding, resin portion 2 is formed. In this molding, the resin portion is made to have a recessed cross-sectional shape, whereby groove 30 as a passage of cooling oil is formed integrally.

The cooling oil is supplied from cutout portion 7 at the upper side in the direction of gravitation, flows through the passage formed by the annular groove 30 on the mold and cover 60 while cooling coils 11 to 22, and successively discharged through an orifice 78 as a discharge port provided at a lower portion of cover 60 in the direction of gravitation.

In groove 30 formed by molding, a projection or projections may be provided at the time of molding the groove 30, for guiding the cooling oil appropriately to enhance heat transfer from the coils to the cooling oil.

In FIGS. 1 and 2, an exemplary structure is shown in which portions of the coils are bared and exposed from the outer surface of resin mold. The effect of cooling coils can be attained to some extent, however, by a structure in which a groove is provided in the resin mold to guide the cooling oil close to the coils, without exposing the coils.

Figure 4:
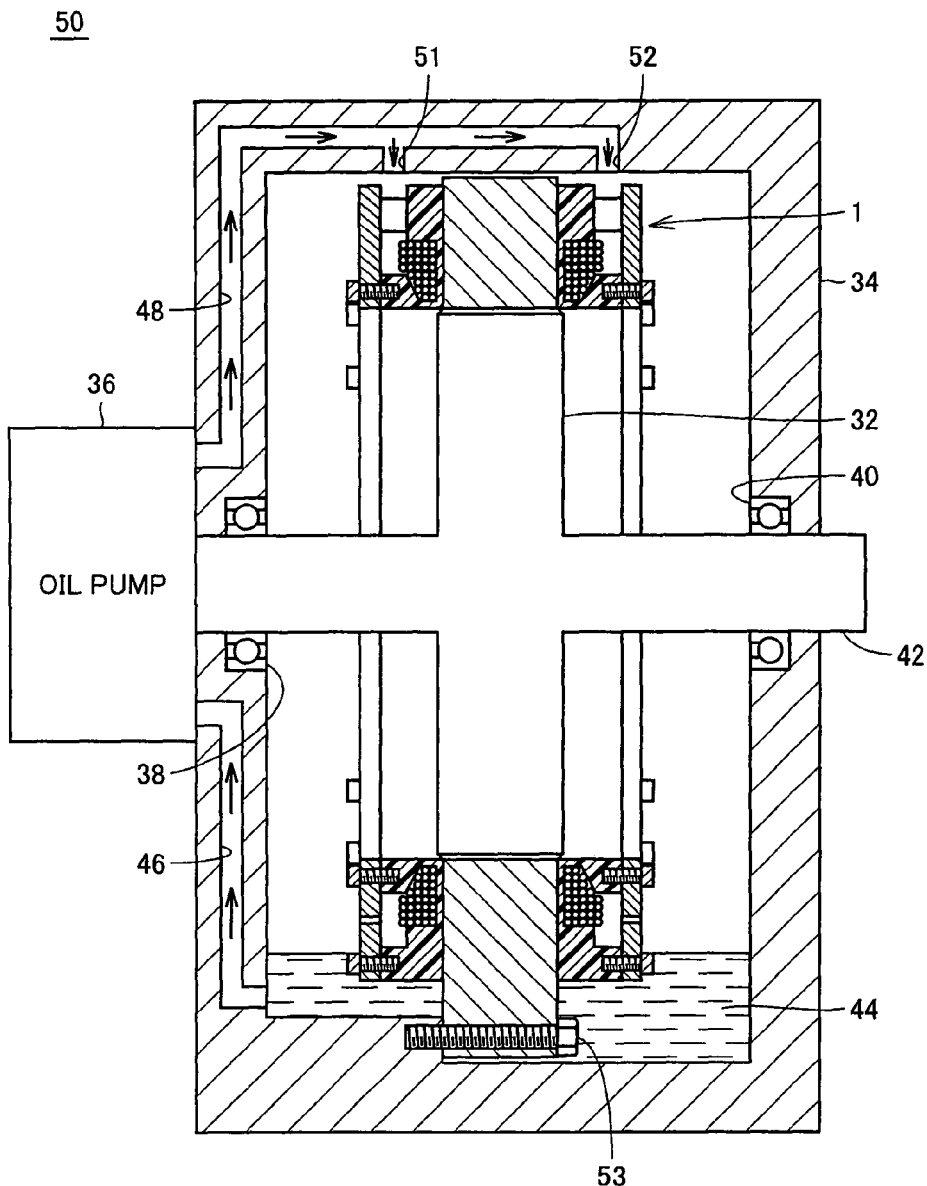
FIG. 4 illustrates a structure for supplying oil to a cutout portion provided at an upper portion of stator 1.

FIG. 4 illustrates a structure for supplying the oil to the cutout portion provided at an upper portion of stator 1.

Referring to FIG. 4, rotating electric machine 50 includes a stator 1, a rotor 32 arranged in stator 1, a case 34 housing stator 1 and rotor 32, ball bearings 38 and 40 fixed on case 34 and rotationally supporting a rotation shaft 42 of rotor 32, and an oil pump 36 attached to rotation shaft 42 and mounted on an outer side of case 34. Stator 1 is fixed by a bolt 53 on case 34.

On case 34, an oil suction passage 46 for sucking in the oil from an oil pool 44 inside the case, and an oil discharge passage 48 for supplying oil fed from oil pump 36 to stator 1 for cooling are provided. At a terminal end of oil discharge passage 48, oil discharge ports 51 and 52 are provided, and the cooling oil is supplied to the central portion of cutout portion 7 of stator 1.

The cooling oil is first pumped up by oil pump 36 from oil pool 44 at the lower portion of the case, passes through oil suction passage 46 provided in case 34 through oil pump 36 and oil discharge passage 48, and is supplied to cutout portion 7 of the stator. The supplied cooling oil cools the stator 2, and then returns to oil pool 44 as it falls by gravitation. An oil cooler may be inserted between oil pool 44 and oil pump 36.

As shown in FIGS. 2 and 3, groove 30 is surrounded by wall portions 3 and 5, and covered with cover 60. Therefore, cooling oil covers most of the exposed portions of coils 11 to 22, and guided to orifice 78 at the lower side in the direction of gravitation. Thus, cooling oil does not flow to an air gap between rotor 32 and stator 1 shown in FIG. 3.

If the cooling oil should enter the air gap between stator 1 and rotor 32, power loss occurs for shearing the same. Such power loss can be prevented by the provision of wall portion 5.

Figure 5:
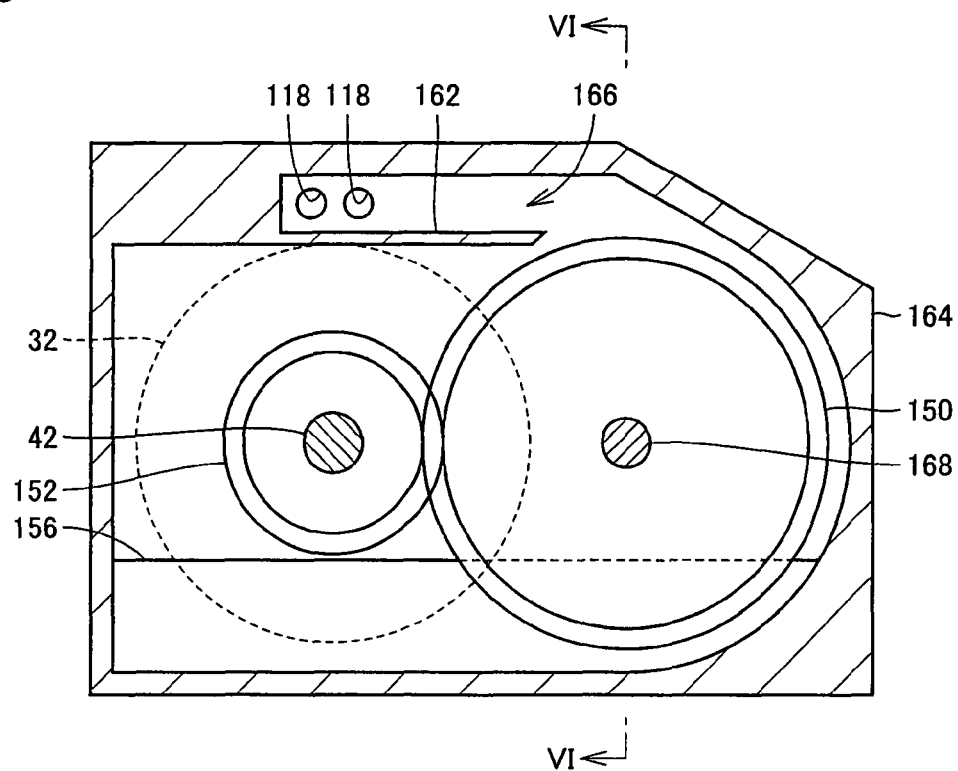
FIG. 5 illustrates another structure for supplying oil.

FIG. 5 illustrates another structure for supplying oil.

Figure 6:
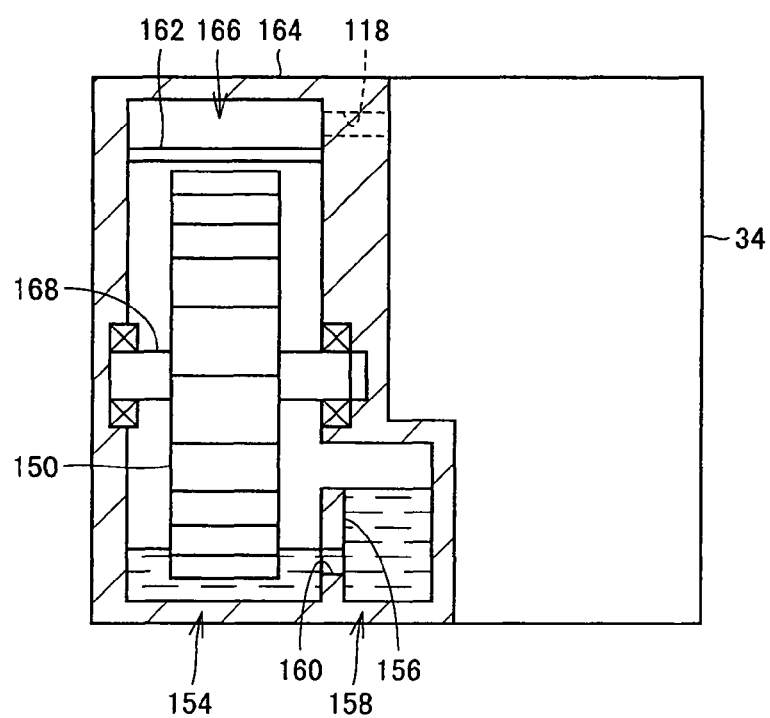
FIG. 6 is a cross-sectional view taken along the line VI-VI of FIG. 5.

FIG. 6 is a cross-sectional view taken along the line VI-VI of FIG. 5.

FIGS. 5 and 6 show a structure of rotating electric machine 5 including stator 1 and rotor 32 shown in FIG. 4, for supplying cooling oil attached outside the case 34, in place of oil pump 36.

On rotation shaft 42 of rotor 32, an output gear 152 is fixed. A gear 150 is formed to have a larger diameter than output gear 152, and the gears mesh with each other outside motor case 34. A lower portion of gear 150 is dipped in lubricant oil stored in a first oil chamber 154.

The first oil chamber 154 is sectioned by a diaphragm 156 to form a second oil chamber 158, and the lubricant oil is stored in each chamber. The second oil chamber 158 is communicated to oil pool 44 shown in FIG. 4. Diaphragm 156 has a narrowed oil path (orifice) 160 at a middle portion along its height, and therefore, it follows that the lubricant oil stored in the second oil chamber 158 is supplied to the first oil chamber 154 with the flow rate limited by narrowed oil path 160.

Further, an oil receiving plate 162 is arranged almost horizontally above output gear 152, and in a space 166 between the plate and gear box 164, a pair of cooling oil supply ports 118 is provided.

Therefore, as rotation shaft 42 of rotor 32 rotates and gear 150 of large diameter meshed with output gear 152 rotates about a rotation shaft 168 extending horizontally, the lubricant oil stored in the first oil chamber is raised by large diameter gear 150.

Then, lubricant oil is fed to space 166 and supplied as the cooling oil through cooling oil supply ports 118 to motor case 34. Specifically, in the rotating electric machine, the cooling oil in the first oil chamber 154 is supplied as rotation shaft 42 rotates, whereby the rotating electric machine itself is cooled. Here, cooling oil supply ports 118 correspond to oil discharge passage 48 shown in FIG. 4.

The lubricant oil stored in the first oil chamber 154 is raised when large diameter gear 150 with its lower portion dipped in the oil rotates along with the rotation of rotation shaft 42, and the oil is fed to motor case 34. The quantity of lubricant oil supplied from the second oil chamber 158 to the first oil chamber 154 is limited by narrowed oil path 160 provided on diaphragm 156. Therefore, the quantity of lubricant oil stored in the first oil chamber is kept constant, and it becomes possible to feed sufficient quantity of cooling oil to motor case 34 for cooling the rotating electric machine stably while suppressing loss that may be otherwise caused by stirring resistance of large diameter gear 150 dipped in excessive lubricant oil.

As described above, in Embodiment 1, a stator structure is adopted for a motor having the resin-molded stator, in which coils wound around the stator core are partially exposed from the outer surface of the mold as shown in FIG. 3 and a flow passage is formed in the mold resin portion to enable direct cooling of coils by the cooling oil.

The flow passage is formed by closing a groove formed in mold resin portion 2 with covers 60 and 79. The cooling oil is supplied from the upper side and discharged from the lower side along the direction of gravitation. To have the portions of coils exposed in the flow passage closed by covers 60 and 79 all dipped in the cooling oil, orifice 78 is provided at the cooling oil discharge port.

Characteristic structures of Embodiment 1 are as follows.

(a) Portions of coils wound around stator core are partially bared and exposed from the outer surface of mold resin portion 2.

(b) Cutout portion 7 as a cooling oil supply port is provided on an upper side of the resin mold along the direction of gravitation in the usage state. The cutout portion may be provided not at the resin mold but at cover 60 or 79.

(c) Cooling oil discharge ports are provided on covers 60 and 79. As the discharge port, a cutout may be formed at the time of molding, at a lower portion of the mold in the direction of gravitation.

(d) A groove for guiding the cooling oil is provided, by forming the resin mold with a recessed cross-sectional shape.

(e) A flow passage of a closed structure is formed, as covers 60 and 79 are put on the mold resin portion 2. It is preferred that an O-ring or a gasket is provided between mold resin portion 2 and covers 60 and 79 for sealing. When the cooling oil is supplied from the upper portion along the direction of gravitation, the oil falls while cooling the exposed portions of coils, and the cooling oil is discharged from the port at a lower portion along the direction of gravitation.

(f) Orifice 78 is provided at the discharge port so that an end portion of the coil is fully dipped or immersed in the cooling oil.

A protruding member or members may be formed, at the time of molding, on the inner side of the flow passage provided as (e), so that the cooling oil covers the coils as uniformly as possible and an area for transferring heat between the coil and the cooling oil is increased.

Further, dependent on the required level of cooling performance, it is sufficient to form the flow passage such that the cooling oil flows close to the coils, without exposing the wound portions of the coils bare at the outer surface of the mold.

Because of such a structure, the heat radiation path is formed that allows direct heat radiation from the coils to the cooling oil, and therefore, thermal resistance between the coil and the cooling oil can significantly be reduced and efficient cooling of the motor becomes possible.

Further, as the closed flow passage is adopted and an orifice is provided, the entire area of exposed portions of the coils come to be in contact with the cooling oil, and hence, the area for heat transfer between the cooling oil and the coils increases. Thus, thermal resistance between the coil and the cooling oil can significantly be reduced and more efficient cooling of the motor becomes possible.

Further, as the flow passage is closed by mold resin portion 2 and covers 60 and 79, the cooling oil hardly enters the air gap between stator 1 and rotor 32, and hence, power loss caused by shearing the cooling oil with rotor 32 can be prevented.

Embodiment 2

Embodiment 2 corresponds to the structure of rotating electric machine in accordance with Embodiment 1, and according to this embodiment, the quantity of supply of the cooling oil, the shape of flow passage and the cross-sectional area of orifice 78 provided at the cooling oil discharge port are set so that the quantity of cooling oil supply becomes larger than (>) the quantity of discharge.

Figure 7:
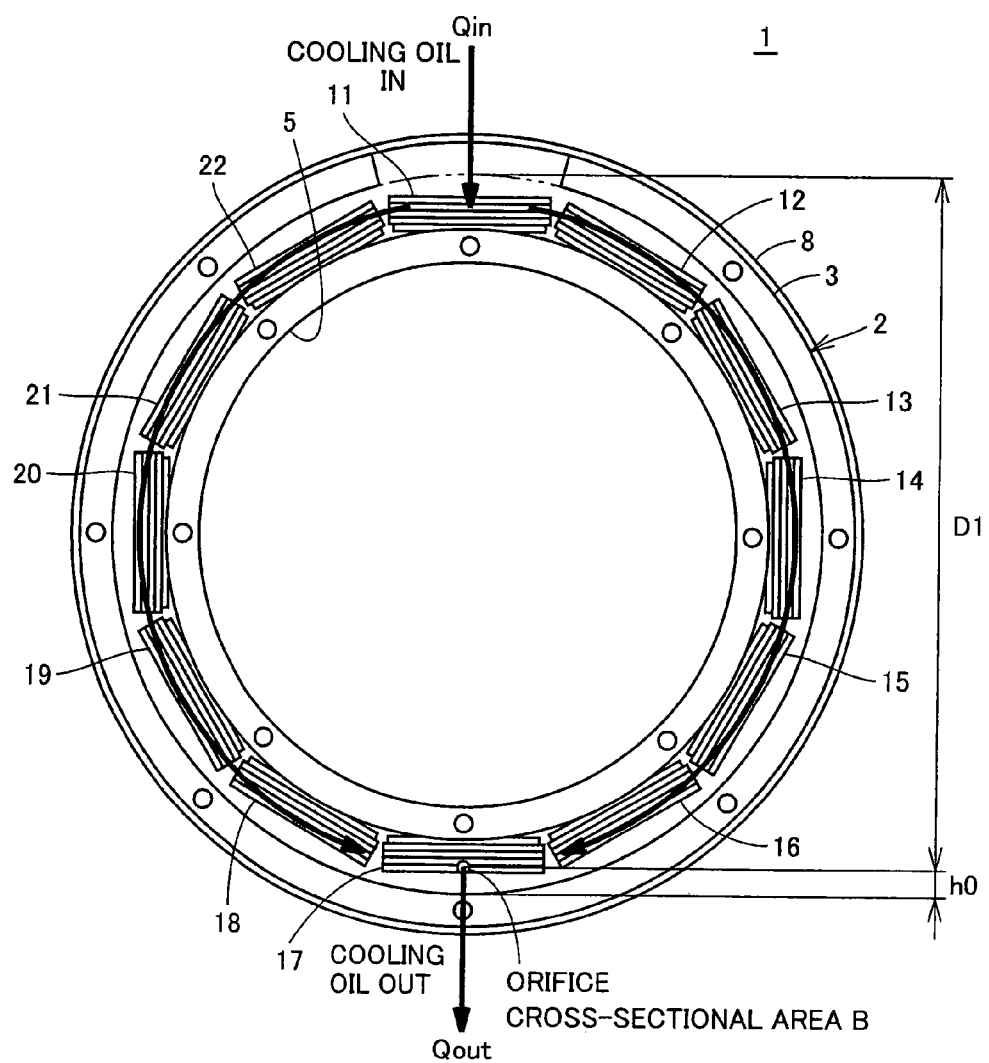
FIG. 7 illustrates the flow of cooling oil.

FIG. 7 illustrates the flow of cooling oil.

Referring to FIG. 7, the cooling oil is supplied from cutout portion 7, and the cooling oil flows through the flow passage as shown by the arrows in FIG. 7 and is discharged through orifice 78.

Let us represent the quantity of cooling oil supply by Qin, dipping height by D1, flow rate coefficient by C, acceleration of gravity by G, initial height of oil surface by h0, and cross-sectional area of orifice 78 by B. Theses values are determined to satisfy the relation represented by the following Equation (1).

$$Q\text{in} \geq D1 \cdot C \cdot (G/2h0)^{1/2} \cdot B \tag{1}$$

Specifically, in order to fill the space of flow passage closed by mold resin portion 2 and covers 60 and 79 with the cooling oil so that the coils are entirely immersed in the cooling oil, the relation $Q\text{in} \geq Q\text{out}$ must be satisfied. The quantity of oil discharged through orifice 78 for discharging the cooling oil is given by the right side of Equation (1) above. Therefore, when specifications of the stator cooling structure are determined to satisfy the relation of Equation (1), it becomes possible to immerse the coils entirely in the cooling oil, and the stator cooling performance can further be improved.

Therefore, according to Embodiment 2, even when the quantity of supplied cooling oil is small, the entire area of coils can reliably be immersed in the cooling oil, and thus, further decrease of coil temperature becomes possible.

Embodiment 3

In Embodiments 1 and 2, cooling performance is improved by dipping portions of the coils that are exposed from the resin mold in the cooling oil. It is noted, however, that when temperature of motor components such as enamel lines and insulating paper attains high while they are dipped in the cooling oil, these components are subjected to hydrolysis caused by a small amount of water contained in the cooling oil, and as a result, mechanical strength and insulation strength of these components degrade.

Therefore, while the coils should be dipped in the cooling oil as much as possible to improve cooling performance, it becomes necessary to improve resistance to oil (resistance to hydrolysis) of the enamel line or insulating paper, and material cost for such components increases.

Embodiment 3 proposes a motor allowing operation under severe load conditions and allowing reduction in size, without necessitating extreme improvement of resistance to oil of components such as the enamel line and the insulating paper, by variably adjusting the coil dipping level in a motor in which the coils are directly cooled by oil.

Figure 8:
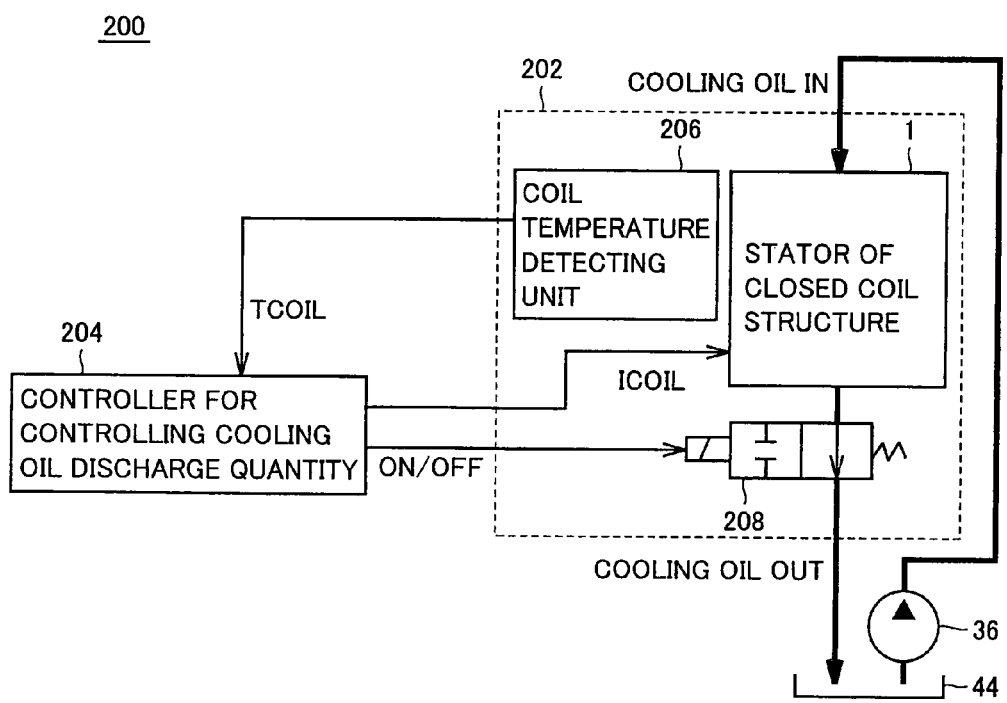
FIG. 8 is a block diagram showing a structure of a rotating electric machine 200 in accordance with Embodiment 3.

FIG. 8 is a block diagram showing a structure of a rotating electric machine 200 in accordance with Embodiment 3.

Referring to FIG. 8, rotating electric machine 200 includes a stator 202 allowing variable adjustment of coil dipping level, a controller 204 for controlling cooling oil discharge quantity, an oil pump 36, and an oil pool 44.

Stator 202 allowing variable adjustment of coil dipping level includes stator 1 of closed coil structure described in Embodiment 1, a coil temperature detecting unit 206 for detecting temperature of a stator coil of stator 1 of closed coil structure, and an electromagnetic valve 208 attached to an oil discharge port of stator 1 of closed coil structure.

Coil temperature detecting unit 206 is provided by embedding a temperature sensor near a coil or between coils shown in FIG. 3 of the closed coil structure and fixed by integral molding with resin mold. Electromagnetic valve 208 is mounted on cooling oil discharge port in place of orifice 78 of cover 60 shown in FIG. 1, and the flow passage is open when electromagnetic valve 208 is not conducted and closed when the valve is conducted (normally open).

When the cooling oil is supplied from an upper portion along the direction of gravitation, the oil cools portions of coils that are bare and exposed along the flow passage and the oil is discharged from the port at a lower portion along the direction of gravitation. At the discharge port, electromagnetic valve 208 is mounted for controlling the quantity of discharge of the cooling oil, and in response to a temperature sensor signal TCOIL from coil temperature detecting unit 206, an on/off signal is output from controller 204 for controlling cooling oil discharge quantity to electromagnetic valve 208. By adjusting the on/off signal, the coil dipping level of the cooling oil can variably be adjusted.

Though the cooling oil is shown to be supplied by oil pump 36 in FIG. 8, a structure in which the cooling oil pooled at a lower portion of the motor housing is raised up by the gear and supplied by gravitational fall through the flow passage provided in the case, as shown in FIGS. 5 and 6, may be used.

Figure 9:
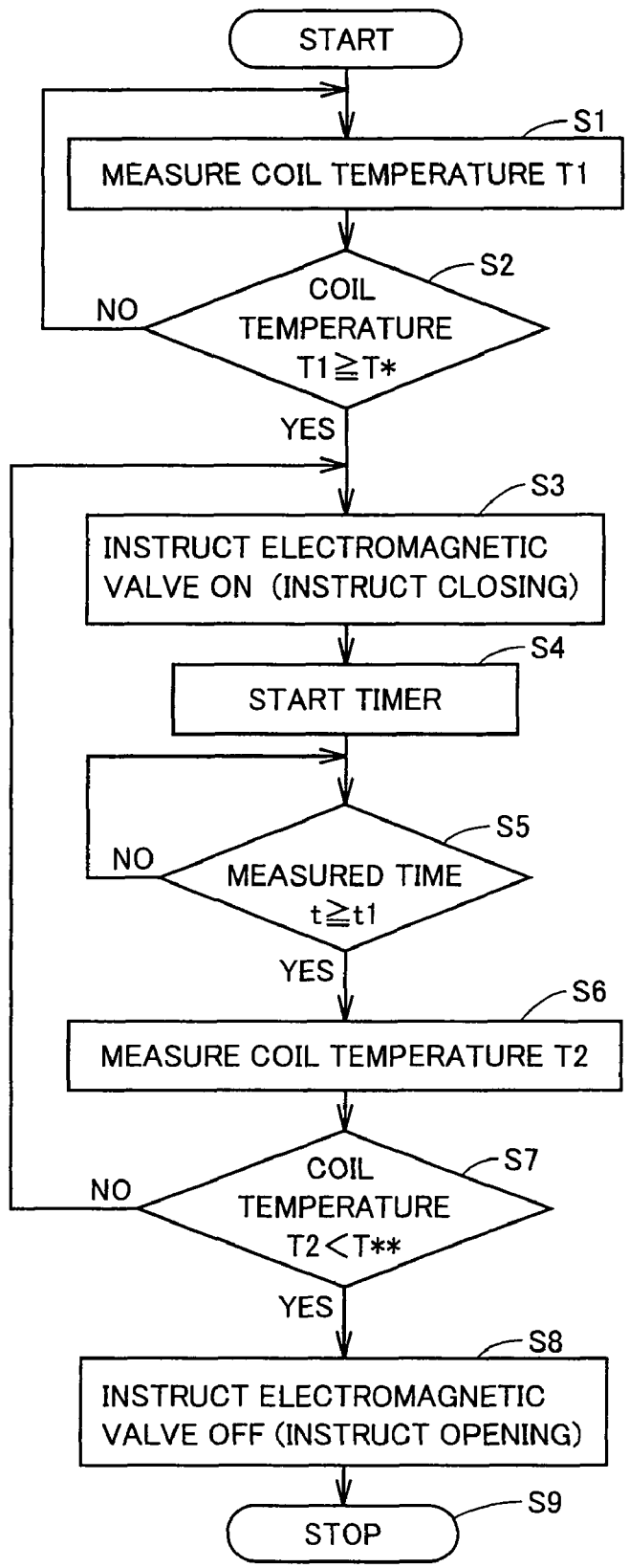
FIG. 9 is a flowchart representing control executed by controller 204 for controlling cooling oil discharge quantity shown in FIG. 8.

FIG. 9 is a flowchart representing control executed by controller 204 for controlling cooling oil discharge quantity, shown in FIG. 8.

Referring to FIG. 9, first, at step S1, controller 204 takes in the temperature sensor signal TCOIL from coil temperature detecting unit 206, and measures coil temperature T1. Next, at step S2, controller 204 determines whether the coil temperature T1 is not lower than a threshold temperature T*.

The threshold value T* is determined by upper temperature limit of motor components, and is given by the following Equation (2).

$$T^* = T0 - \alpha \quad (2)$$

Here, T0 represents upper temperature limit of motor component (enamel line, insulating paper), and α represents a margin.

If coil temperature $T1 \geq T^*$ at step S2, the process proceeds to step S3. If $T1 \geq T^*$ is not satisfied, the process returns to step S1.

At step S3, controller 204 transmits an ON instruction to electromagnetic valve 208. Thus, electromagnetic valve 208 is set to a closed state, and coil dipping level begins to increase. Then, at step S4, a timer in controller 204 starts its operation. Thus, time measurement starts.

Next, the process proceeds to step S5 and whether the measured time t is not shorter than a threshold value t1 of measured time is determined.

The threshold value t1 of measured time is determined by the quantity Q of supplied cooling oil and the volume V of the closed portion, in accordance with the following Equation (3).

$$t1 = V/Q \quad (3)$$

Until the measured time reaches threshold value t1, the process waits at step S5, and when the measured time exceeds the threshold value t1, the process proceeds to step S6.

At step S6, controller 204 again takes in the temperature sensor signal TCOIL from coil temperature detecting unit 206, and measures the coil temperature T2.

After the end of measurement at step S6, the process proceeds to step S7, and whether the coil temperature T2 is smaller than a threshold value T** given by Equation (4) below or not is determined.

$$T^{**} = T^* - \beta \quad (4)$$

Here, T* is the threshold value obtained in accordance with Equation (2) above, and β is a margin.

At step S7, if coil temperature T2 is not lower than the threshold value T**, the process proceeds to step S3, at which the electromagnetic valve is tuned on and set to a closed state, so that the coil dipping level is increased.

If the coil temperature is lower than the threshold value T** at step S7, the process proceeds to step S8. At step S8, the electromagnetic valve is turned off and set to an open state, so that the coil dipping level is decreased. After the end of step S8, the process proceeds to step S9, and the process of one cycle is completed.

Assume that T0=160° C., α=20° C. and β=40° C. Then, when the coil temperature is 140° C. or higher, the electromagnetic valve for controlling the discharge quantity of cooling oil is turned on, and thus, cooling with fully immersed state becomes possible. When the coil temperature lowers to 120° C. or lower, the electromagnetic valve for controlling discharge quantity of cooling oil is turned off, and the state of cooling is returned to the original state.

By performing the process shown in FIG. 9 at every prescribed time period, the coil dipping level is adjusted. In Embodiment 3, electromagnetic valve 208 is attached to stator 1 having the cooling structure of Embodiment 1. When the coil temperature measured by coil temperature measuring unit 206 exceeds the threshold value T*, the electromagnetic valve is closed and the portions of closed structure are fully filled with the cooling oil. When the coil temperature is not higher than the threshold value T**, the electromagnetic valve is open, and the cooling oil simply flows down by gravitational fall over coil ends, and the cooling oil is not stored in this case.

As described above, in the rotating electric machine described in Embodiment 3, it is possible to change the state of dipping the exposed coil portions, in accordance with the coil temperature. Therefore, the cooling performance can be changed. The coils are set in the fully immersed state only when the coil temperature is high, and the coils are cooled by the cooling oil simply flowing down by gravitation at other times, so that the components such as the enamel line and the insulating paper are exposed to the cooling oil only for a short time period. Thus, degradation in mechanical and insulating strength can be limited. Further, the enamel line or insulating paper is not required of very high resistance to oil, and hence, cost of the components can be lowered.

Embodiment 4

In Embodiment 4, the electromagnetic valve controlled by controller 204 of Embodiment 3 is controlled in a different manner.

Figure 10:
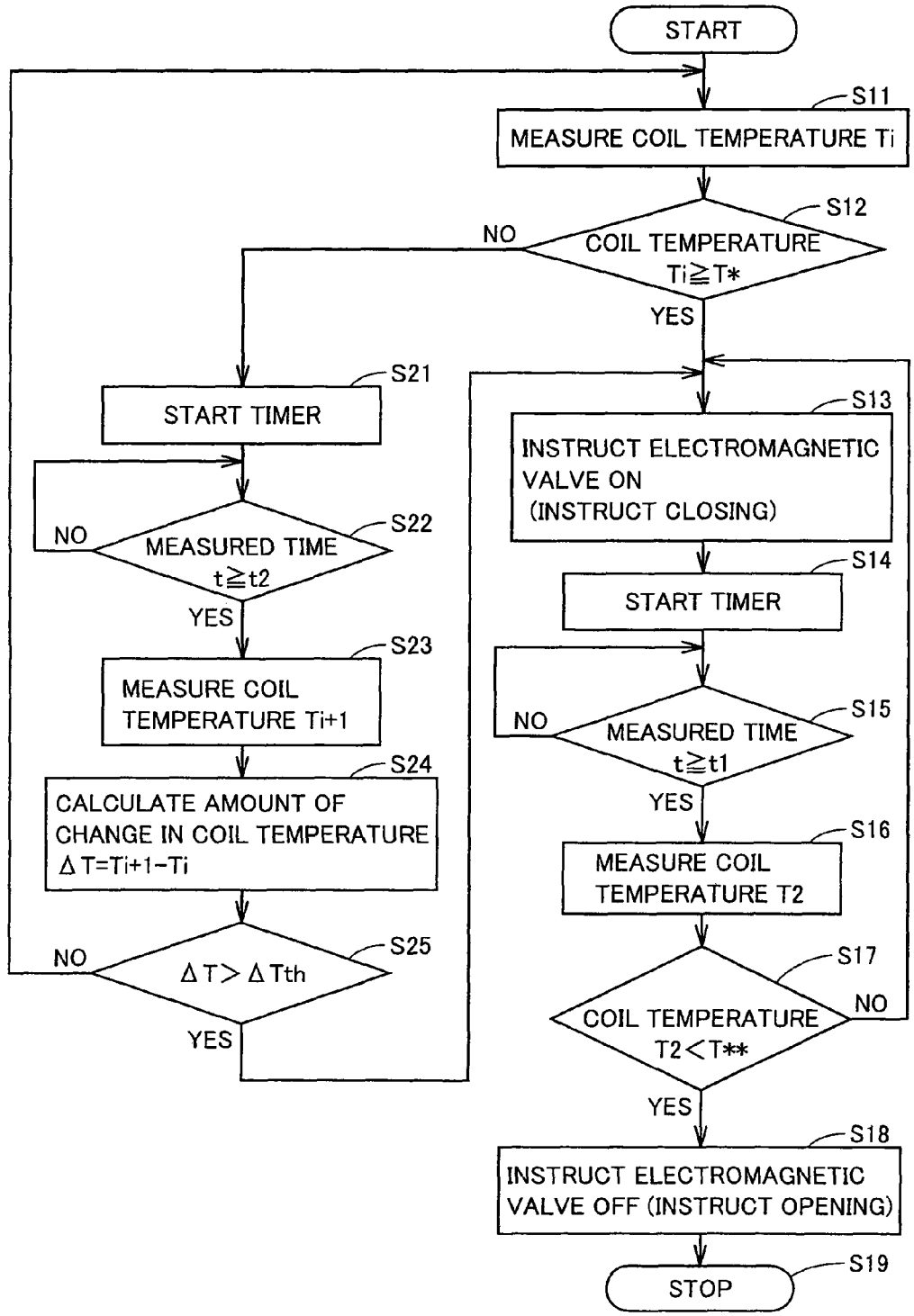
FIG. 10 is a flowchart representing control executed by controller 204 in accordance with Embodiment 4.

FIG. 10 is a flowchart representing the control executed by controller 204 in accordance with Embodiment 4.

Referring to FIG. 10, first, at the start of the process at step S11, controller 204 takes in the temperature sensor signal TCOIL output by coil temperature detecting unit 206 and measures the coil temperature Ti. Then, the process proceeds to step S112, at which whether the coil temperature Ti is not lower than the coil temperature threshold value T* is determined. The coil temperature threshold value T* has already been described using Equation (2) in Embodiment 3, and therefore, description thereof will not be repeated. If $Ti \geq T^*$ is satisfied at step S12, the process proceeds to step S13. If $Ti \geq T^*$ is not satisfied at step S21, the process proceeds to step S21.

At step S21, controller 204 starts a timer contained therein. Thus, measurement of time t starts.

Next, at step S22, whether the measured time exceeded a time threshold value t2 or not is determined, and the process waits until $t \geq t2$ is satisfied.

The threshold value t2 of measured time used at step S22 is given by Equation (5) from the quantity Q of supplied cooling oil and the volume V of the closed portion.

$$t2 = V/Q \quad (5)$$

If $t \geq t2$ is satisfied at step S22, the process proceeds to step S23, where the coil temperature Ti is again measured and the coil temperature Ti+1 is obtained.

Next, at step S24, difference ΔT between the last measured coil temperature Ti and the coil temperature Ti+1 measured at step S23 is calculated. Next, at step S25, whether the amount of change ΔT of coil temperature exceeded a prescribed threshold value ΔTth or not is determined.

If $\Delta T \geq \Delta Tth$ is not satisfied at step S25, the process returns to step 511. If $\Delta T \geq \Delta Tth$ is satisfied at step S25, the process proceeds to step S13.

At steps S13 to S19, processes similar to those of steps S3 to S9 described with reference to FIG. 9 are performed. These processes have already been described with reference to FIG. 9, and therefore, description thereof will not be repeated.

As described above, in Embodiment 4, by the process shown in steps S21 to S24, when the amount of change ΔT in coil temperature measured by coil temperature detecting unit 206 exceeds a certain threshold value ΔTth, the flow proceeds to step S13 and the flow passage of the closed structure comes to be fully filled with the cooling oil. Thus, the cooling performance is improved. Thereafter, if the coil temperature attains to the threshold value T** or lower, the electromagnetic valve is set to an open state at step S18, and the cooling oil simply flows down by gravitation.

By such an arrangement, it becomes possible when the temperature exceeds a prescribed value and, in addition, when the temperature changes significantly, to quickly have the coils dipped in the cooling oil and to improve the cooling performance, whereby burning of the motor components can be prevented. By way of example, the temperature changes significantly when the vehicle climbs up a steep slope, or when the vehicle is rapidly accelerated for overtaking, that is, when much electric power is fed to the coils.

Embodiment 5

In Embodiment 5, control by controller 204 shown in FIG. 8 of Embodiment 3 is different from that of Embodiment 3.

Figure 11:
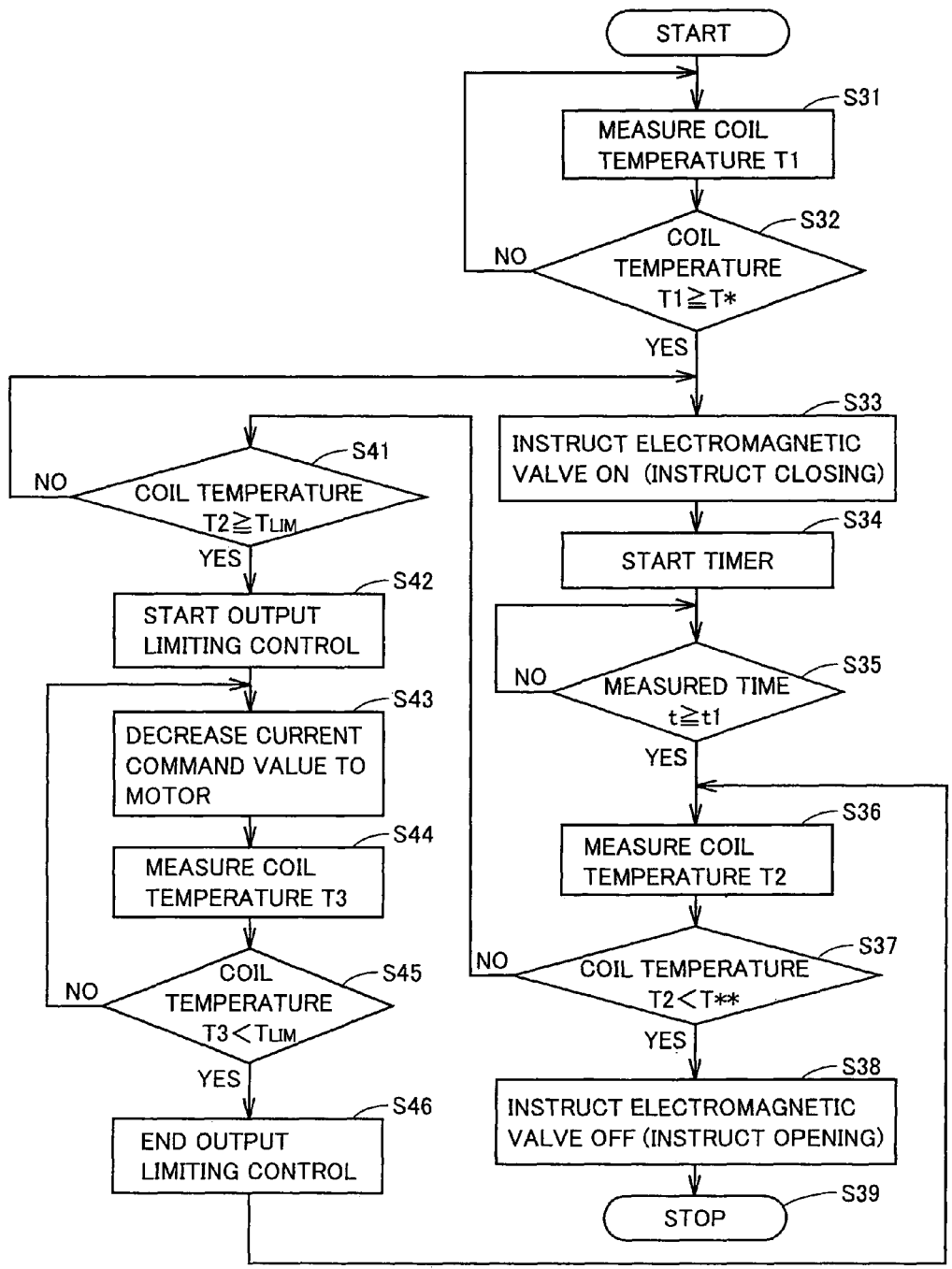
FIG. 11 is a flowchart representing control executed by controller 204 in accordance with Embodiment 5.

FIG. 11 is a flowchart representing the control executed by controller 204 in accordance with Embodiment 5.

Referring to FIG. 11, process steps S31 to S39 correspond to process steps S1 to S9 of FIG. 9, respectively.

The process shown in FIG. 9 differs from that of FIG. 11 in that the process of steps S41 to S46 is performed when coil temperature T2<T** is not satisfied at step S37. Therefore, description of the process of steps S31 to S39 will not be repeated, as corresponding steps S1 to S9 have already been described with reference to FIG. 9.

If coil temperature T2<T** is not satisfied at step S37 of FIG. 11, the process proceeds to step S41. At step S41, whether coil temperature $T2 \geq TLIM$ is satisfied or not is determined. Here, TLIM is a threshold value of the coil temperature, which is given by Equation (6).

$$TLIM = T0 - \gamma$$

Here, T0 is an upper limit temperature of motor component (enamel line, insulating paper), and γ is a prescribed margin.

If $T2 \geq TLIM$ is not satisfied at step S41, the process returns to step S33. If $T2 \geq TLIM$ is satisfied at step S41, the process proceeds to step S42. At step S42, controller 204 shown in FIG. 8 starts an output limiting control on stator 1.

Next, at step S43, controller 204 lowers a current limiting command value ICOIL to the motor. The current limiting command value ICOIL is a limit value representing the maximum current at the time point that can be caused to flow through the motor coil. Next, at step S44, controller 204 takes in the temperature sensor signal TCOIL from coil temperature detecting unit 206, and measures coil temperature T3.

Next, at step S45, coil temperature T3 is compared with the threshold value TLIM. If T3<TLIM is not satisfied at step S45, the process returns to step S43, and the current limiting command value ICOIL to the motor is further lowered.

If T3<TLIM is satisfied at step S45, the process proceeds to step S46, and the output limiting control is terminated. After the end of the process of step S46, the process proceeds to step S36, and the coil temperature T2 is measured.

Description of the processes of steps S31 to S39 will not be repeated, as corresponding steps S1 to S9 have already been described with reference to FIG. 9.

As described above, according to Embodiment 5, if the coil temperature exceeds the threshold value T* determined from the upper limit temperature of motor components, the electromagnetic valve is set to the closed state, and the portions of closed structure are fully filled with the cooling oil. Further, if the coil temperature exceeds the threshold value TLIM in this state, controller 204 decreases the amount of electric power fed to the stator coil, to prevent increase of the coil temperature and to prevent burning.

Assume, for example, that T0=160° C., α=20° C., β=40° C. and γ=5° C. Then, electromagnetic valve 208 is set to a closed state if the coil temperature is 140° C. or higher, and the coils are cooled in the fully immersed state. When the coil temperature lowers to 120° C. or lower, the electromagnetic valve for controlling discharge quantity of cooling oil is turned off, and the state of cooling is returned to the original state. If the coil temperature exceeds 150° C., controller 204 starts the motor output limiting control limiting the current flowing through the coils of stator 1, to reduce heat generation itself.

In this manner, the coil dipping level can variably be adjusted in Embodiment 5, and hence, the cooling performance can be changed in accordance with the state of coils. Further, if the improved cooling performance realized by the state in which the coils are fully immersed in the cooling oil is still insufficient, the motor output is limited, and thus, burning of motor components can perfectly be prevented.

Embodiment 6

In Embodiments 3 to 5, a coil temperature sensor is provided close to a stator coil, and the coil temperature is detected. From time when a current is caused to flow through the coil until the coil temperature increases and it is transmitted through the mold resin and detected by the temperature sensor, there is some time lag due to heat transfer through the resin or response of the temperature sensor. When increase in coil temperature is expected in advance, it is desirable to increase the coil cooling capability as soon as possible.

Figure 12:
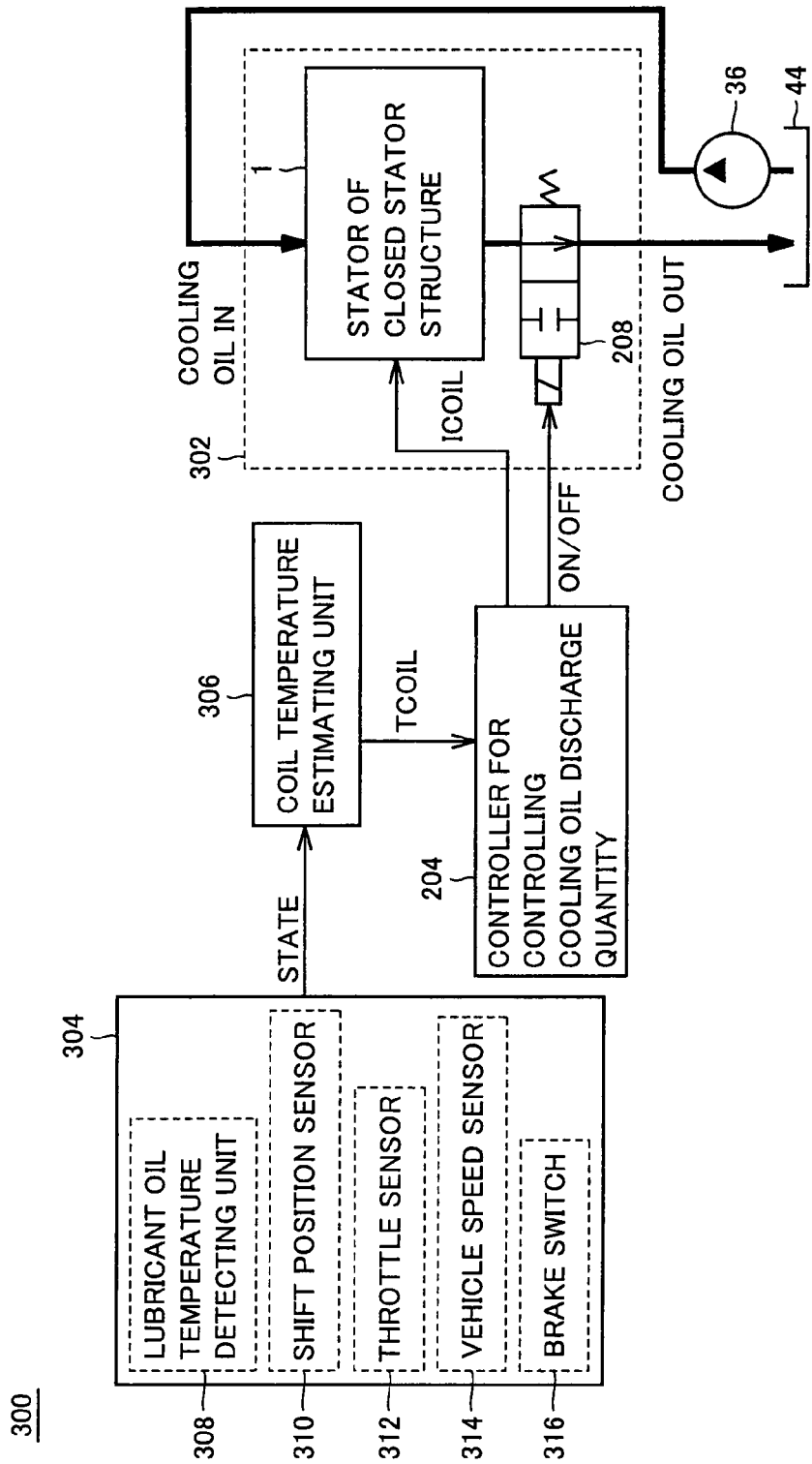
FIG. 12 is a block diagram showing a structure of a rotating electric machine 300 in accordance with Embodiment 6.

FIG. 12 is a block diagram representing the structure of a rotating electric machine 300 in accordance with Embodiment 6.

Referring to FIG. 12, rotating electric machine 300 includes a vehicle state measuring sensor 304, a coil temperature estimating unit 306, a controller 204 for controlling cooling oil discharge quantity, an oil pump 36 for supplying cooling oil to a stator 302 allowing variable adjustment of coil dipping level, and an oil pool 44 receiving the cooling oil discharged from stator 302 allowing variable adjustment of coil dipping level.

Vehicle state measuring sensor 304 includes a lubricant oil temperature detecting unit 308, a shift position sensor 310, a throttle sensor 312, a vehicle speed sensor 314, and a brake switch 316. Stator 302 allowing variable adjustment of coil dipping level includes stator 1 having the closed coil structure described with reference to Embodiment 1, and an electromagnetic valve 208 incorporated at an oil discharge port of stator 1 in place of the orifice.

Vehicle state measuring sensor 304 outputs a signal STATE representing the state of the vehicle detected by each of the sensors provided inside. Coil temperature estimating unit 306 receives the signal STATE, and outputs a signal TCOIL representing the estimated coil temperature. Controller 204 turns on/off electromagnetic valve 208, in accordance with the coil temperature obtained by calculation. The shape of stator 1 of closed coil structure has been described with reference to FIGS. 1 to 3 and, therefore, description thereof will not be repeated.

Figure 13:
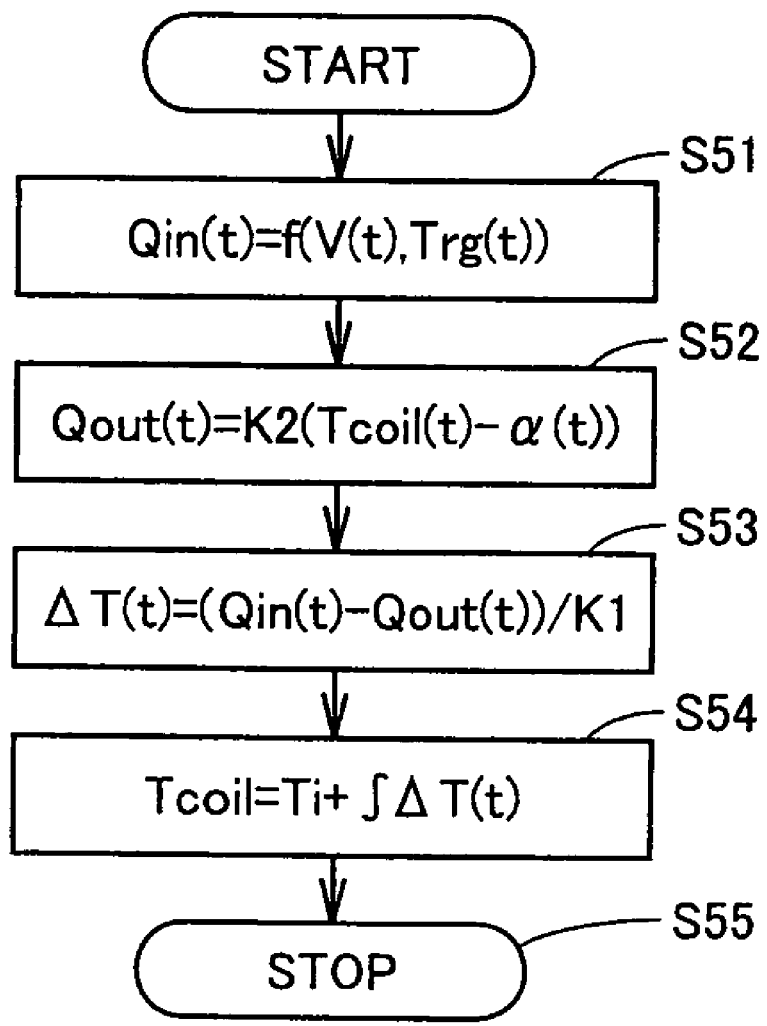
FIG. 13 is a flowchart representing a process of estimating coil temperature by a coil temperature estimating unit 306.

FIG. 13 is a flowchart representing the process of estimating coil temperature executed by coil temperature estimating unit 306.

Coil temperature estimating unit 306 calculates the coil temperature based on signals representing the vehicle state from shift position sensor 310, throttle sensor 312, vehicle speed sensor 314, brake switch 316 and lubricant oil temperature detecting unit 308, which are generally provided in commercially available vehicles. The coil temperature estimating unit is actually written as a part of a program in controller 204 or in a controller for motor control. For easier understanding, however, coil temperature estimating unit 306 is shown independent from controller 204, in FIG. 12.

Referring to FIG. 13, first, coil temperature estimating unit 306 calculates the quantity of heat generated by the motor, in accordance with Equation (7) below, at step S51.

$$Q\text{in}(T) = f(V(t), Trq(T)) \quad (7)$$

Here, Qin represents the quantity of heat generated at the motor, V represents motor rotation speed, and Trq represents motor torque. The quantity of heat Qin generated at the motor is stored in advance in the form of a map, as a function of motor rotation speed V and motor torque Trq, and the function f is for reading, from the map, the quantity of heat generated at the motor.

Next, at step S52, the quantity of heat Qout radiated from the coil is calculated in accordance with Equation (8) below.

$$Q\text{out}(t) = K2(T\text{coil}(t) - \alpha(t)) \quad (8)$$

Here, Qout represents the quantity of heat radiated from the coil, K2 represents an electrothermic constant, α represents a core temperature, and Tcoil represents the coil temperature.

Next, at step S53, the amount of increase in coil temperature is calculated in accordance with Equation (9) below.

$$\Delta T(t) = (Q\text{in}(t) - Q\text{out}(t))/K1 \quad (9)$$

Here, ΔT represents the amount of increase in coil temperature, Qout represents the quantity of heat radiated from the coil, and K1 represents heat capacity of the coil.

Next, at step S54, coil temperature Tcoil is calculated in accordance with Equation (10) below.

$$T\text{coil} = Ti + \int \Delta T(t) \quad (10)$$

Here, Ti represents initial temperature.

Finally, the process proceeds to step S55, and the coil temperature estimating process ends. By repeating the process of the flowchart shown in FIG. 13, the coil temperature Tcoil at present can be calculated.

Figure 14:
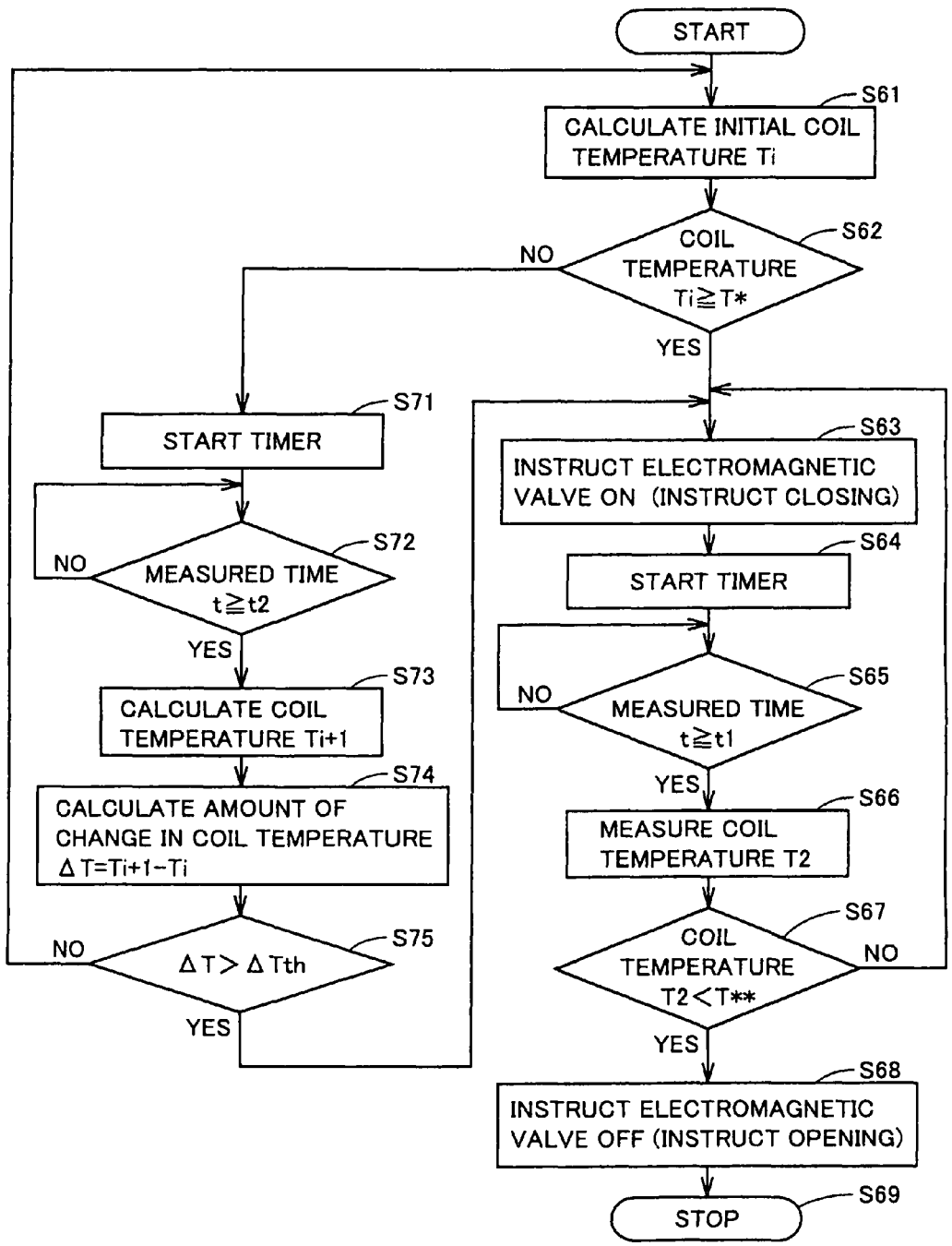
FIG. 14 is a flowchart representing a process executed by controller 204 shown in FIG. 12.

FIG. 14 is a flowchart representing the process executed by controller 204 shown in FIG. 12.

Steps S61 to S75 of FIG. 14 correspond to steps S11 to S25 of the flowchart described with reference to FIG. 10, respectively. The flowchart of FIG. 14 differs from the flowchart of FIG. 10 in that at step S61, initial coil temperature Ti is calculated by coil temperature estimating unit 306 rather than the measurement of coil temperature, and at step S73, coil temperature Ti+1 is calculated by coil temperature estimating unit 306 in the similar manner. Except for these points, the process performed in accordance with the flowchart of FIG. 14 is similar to the process of respective steps of the flowchart shown in FIG. 10, and therefore, description thereof will not be repeated.

As described above, in the rotating electric machine described as Embodiment 6, first, the state of dipping the coil in oil can be changed in accordance with the coil temperature, and hence, the cooling performance can be changed. The coils are set in the fully immersed state only when the coil temperature is high, and the coils are cooled by the cooling oil simply flowing down by gravitation at other times, so that the components such as the enamel line and the insulating paper are exposed to the cooling oil only for a short time period. Thus, degradation in mechanical and insulating strength can be limited. Further, the enamel line or insulating paper is not required of very high resistance to oil, and hence, cost of the components can be lowered.

In addition, the thermistor for detecting temperature to be attached to the coil portion becomes unnecessary, and hence, the cost can be reduced. Further, the problem of delayed response of the thermistor for detecting temperature is eliminated, and hence, it becomes possible to quickly improve the cooling capability before the coil temperature increases excessively.

Embodiment 7

In Embodiments 1 to 6, structures in which the cooling oil is supplied from an upper side along the direction of gravitation and the oil is discharged from the discharge port at the lower side have been described. In Embodiment 7, a stator having a structure in which the cooling oil is supplied from the lower side along the direction of gravitation, the coils are fully immersed in the cooling oil and the oil is discharged from the upper side along the direction of gravitation, will be described.

Figure 15:
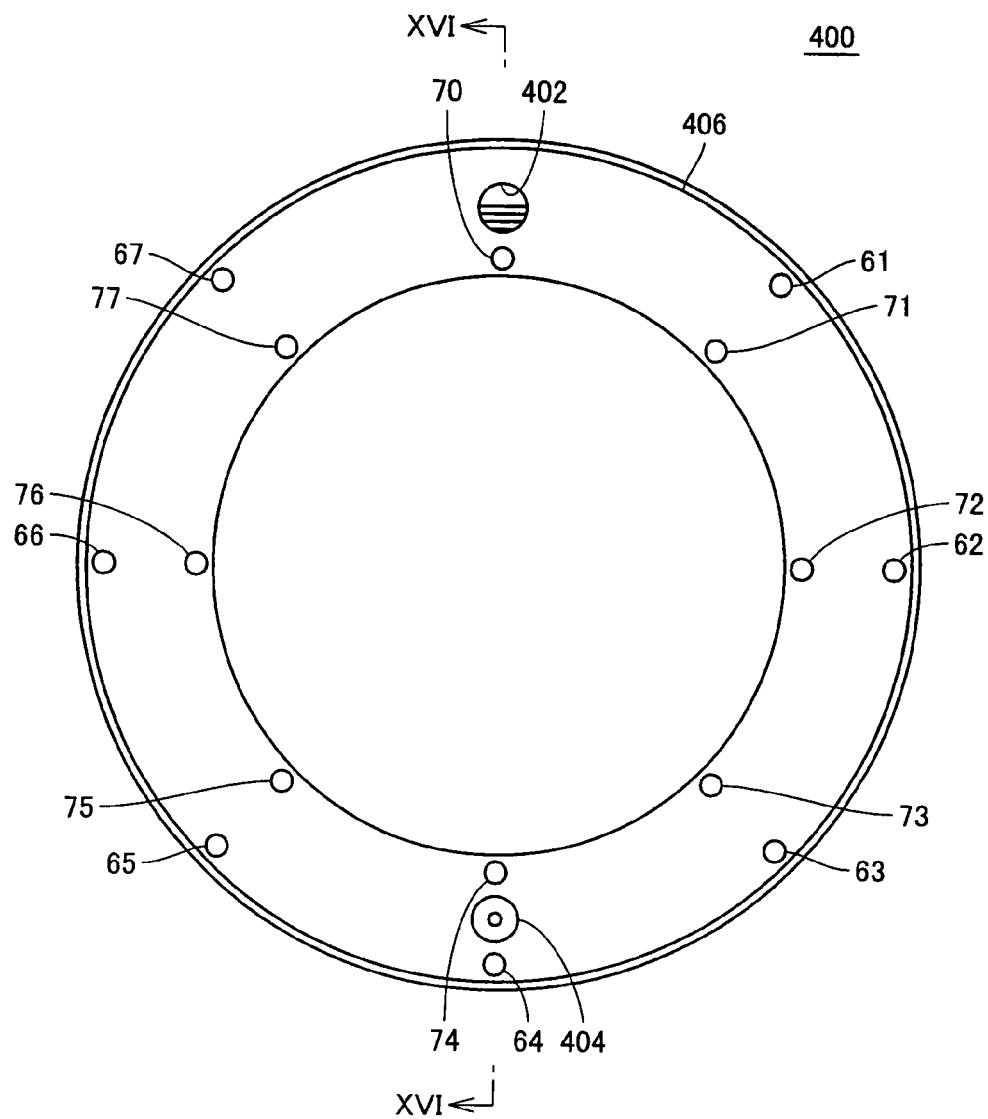
FIG. 15 is a front view of a stator 400 used in Embodiment 7.

FIG. 15 is a front view of a stator 400 used in Embodiment 7.

Figure 16:
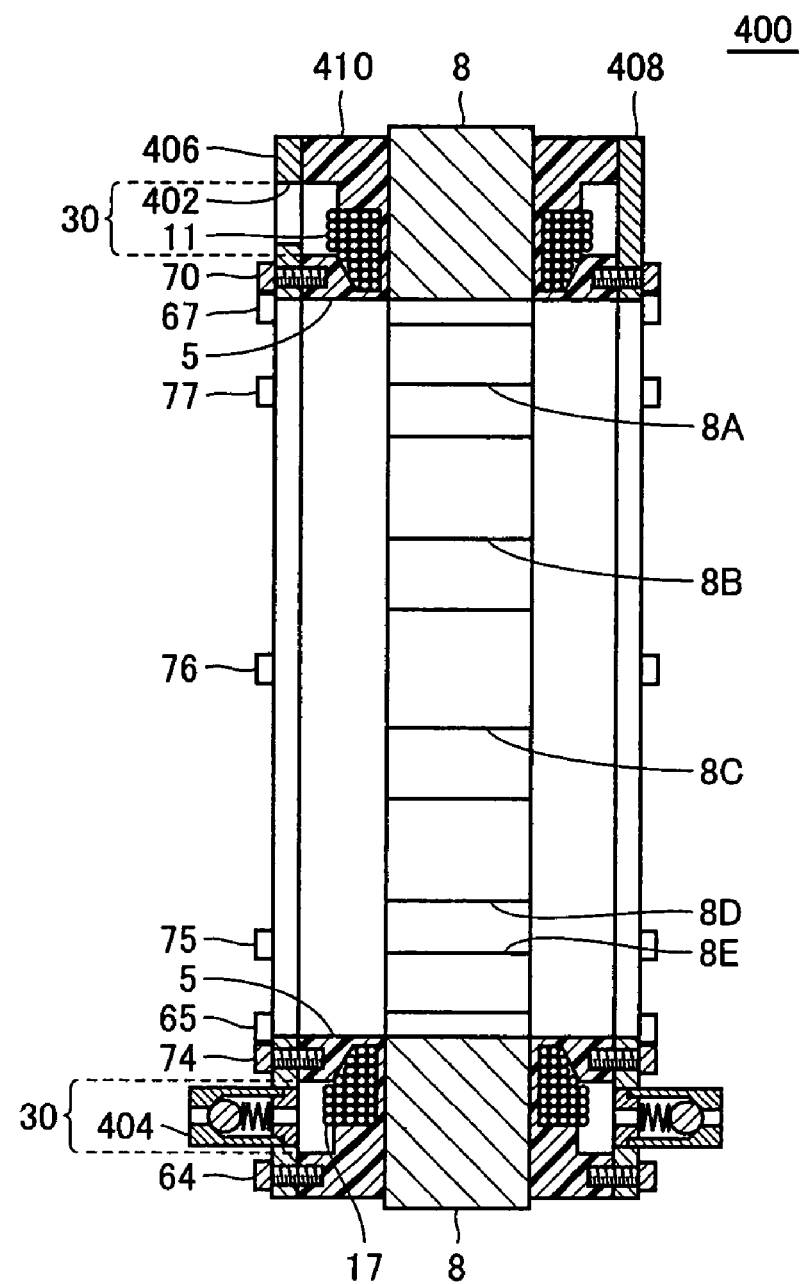
FIG. 16 is a cross-sectional view taken along the line XVI-XVI of FIG. 15.

FIG. 16 is a cross-sectional view taken along the line XVI-XVI of FIG. 15.

Referring to FIGS. 15 and 16, stator 400 used in Embodiment 7 has a structure of stator 1 described with reference to FIGS. 1 to 3, with covers 60 and 79 replaced by covers 406 and 408. Cover 406 has, at a portion corresponding to orifice 78 of cover 60, a cooling oil supply port. Further, at an upper portion in the direction of gravitation of cover 406, a cooling oil discharge port 402 is provided.

Further, in place of resin portion 2, a resin portion 410 is used. Resin portion 410 is different from resin portion 2 in that cutout portion 7 of resin portion 2 shown in FIG. 3 is not provided, and wall portion 3 is continuous around the outer circumference. Cover 408 has a structure similar to cover 406. Except for these points, the structure of stator 400 is the same as that of stator 1 described with reference to FIGS. 1 to 3 and, therefore, description thereof will not be repeated.

In stator 400, winding portion of the coil is partially made bare and exposed from the outer surface of the resin mold. The cooling oil supply port is provided at a lower portion and the cooling oil discharge port is provided at an upper portion of cover 406. By mold resin portion 410 and covers 406 and 408, the bare, exposed coil portions come to be situated in the oil flow passage of a closed structure. It is preferred that an O-ring or a gasket is provided between mold resin portion 410 and covers 406 and 408 for sealing.

When the cooling oil is supplied from the lower portion in the direction of gravitation, the oil flow passage comes to be fully filled with the cooling oil, and the cooling oil is discharged from discharge port 402 at the upper portion in the direction of gravitation. It may also be possible to form resin portion 410 by resin molding, and to provide a check valve 404 implemented by a ball and a spring at the cooling oil supply port, in order to maintain the state in which the coils are dipped in the cooling oil even when the cooling oil supply pump is stopped.

Further, dependent on the level of required cooling performance, it may be sufficient to have the cooling oil flow close to the coils, without exposing the coil portions as shown in FIG. 3.

When the stator in accordance with Embodiment 7 is adopted, the entire area of exposed portions of the coils come to be in contact with the cooling oil, and hence, the area for heat transfer between the cooling oil and the coils increases. Thus, thermal resistance between the coil and the cooling oil can significantly be reduced and more efficient cooling of the motor becomes possible.

Further, the flow passage through which the cooling oil flows is made to have a closed structure by the resin mold and the covers. Therefore, entrance of cooling oil to the air gap between the stator and the rotor can be prevented, and hence, power loss caused thereby can be reduced.

In addition, in the structure in which the oil is caused to flow from the supply port at the lower portion to the discharge port at the upper portion, the exposed portions of the coils can be kept fully immersed in the cooling oil even when the quantity of supply of oil per unit time is small or when oil supply is often stopped, and hence, the motor cooling efficiency can further be improved.

Embodiment 8

Figure 17:
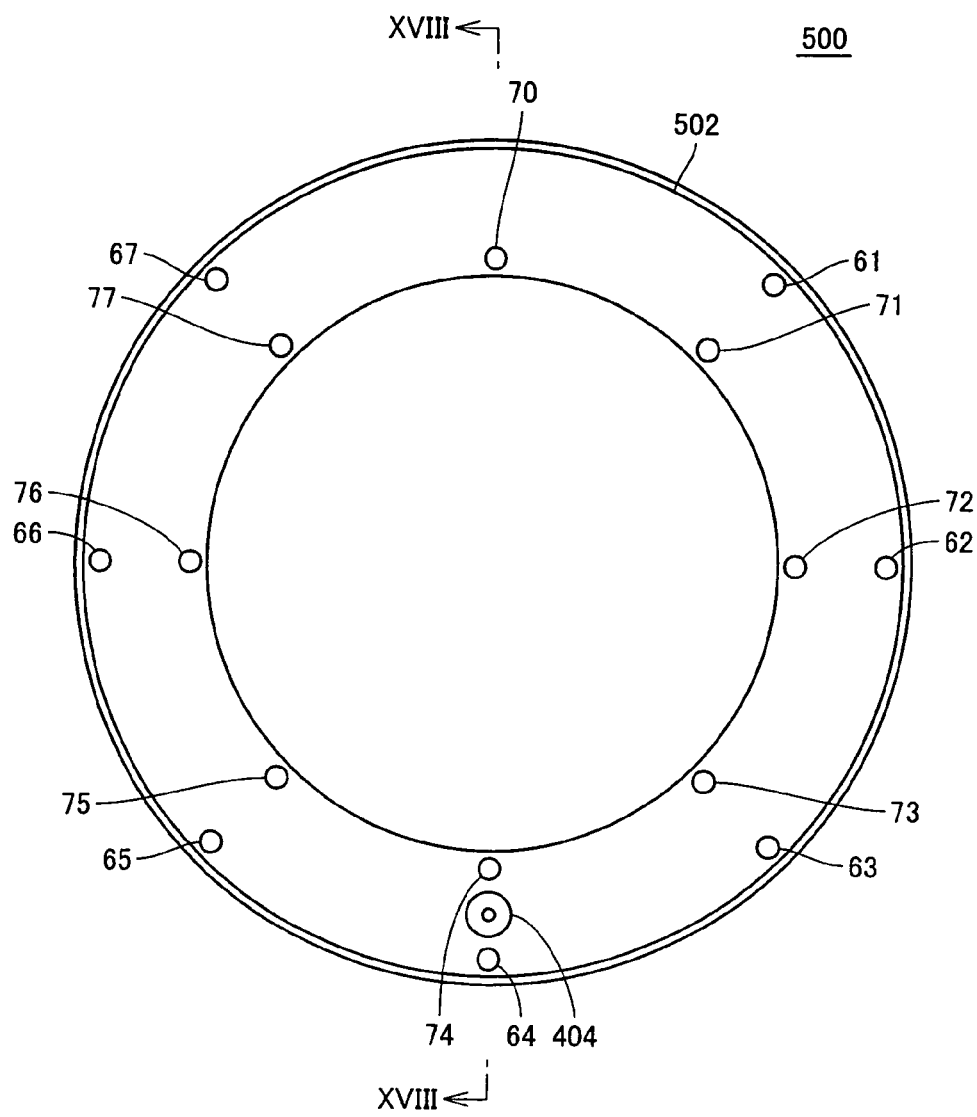
FIG. 17 is a front view of a stator 500 used in Embodiment 8.

FIG. 17 is a front view of a stator 500 used in Embodiment 8.

Figure 18:
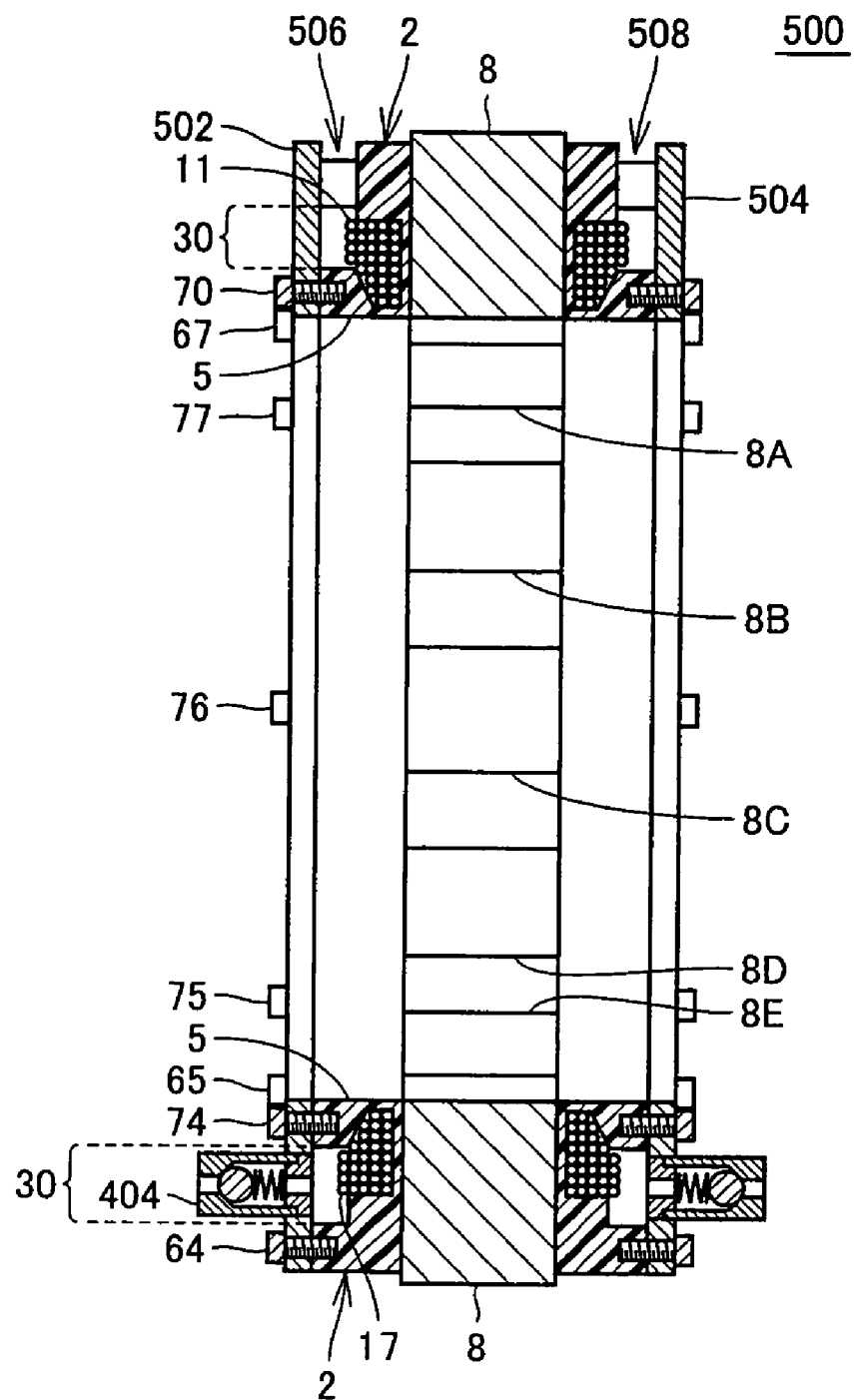
FIG. 18 is a cross-sectional view taken along the line XVIII-XVIII of FIG. 17.

FIG. 18 is a cross-sectional view taken along the line XVIII-XVIII of FIG. 17.

Referring to FIGS. 17 and 18, stator 400 has the structure of stator 400 described with reference to FIGS. 15 and 16 and includes, in place of covers 406 and 408, covers 502 and 504. Further, in place of resin portion 410, it includes resin portion 2 described with reference to FIGS. 2 and 3.

Except for these points, stator 400 described in Embodiment 7 and stator 500 in accordance with Embodiment 8 have similar structures, and therefore, description thereof will not be repeated.

Cover 502 is not provided with cooling oil discharge port 402 provided on cover 406 of FIG. 15. In place thereof, at an upper portion of resin portion 2, a cutout is provided and overflow ports 506 and 508 are formed for discharging the cooling oil.

Figure 19:
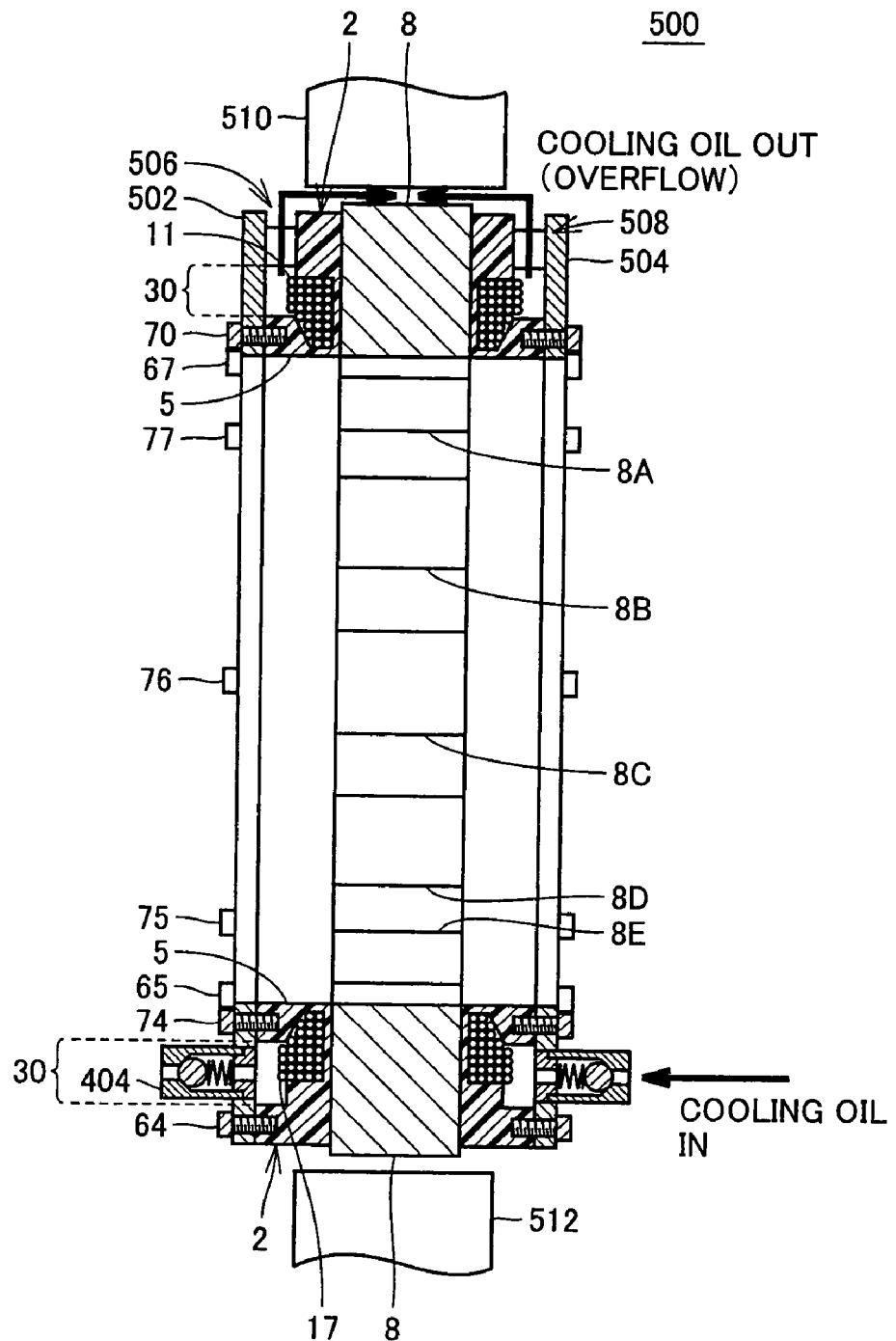
FIG. 19 illustrates penetration of cooling oil from an overflow port.

FIG. 19 illustrates penetration of cooling oil through the overflow ports.

As shown in FIG. 19, stator 400 is housed in a case, and there is a small space (of about 70 μm) between the stator core and an upper portion 510 or lower portion 512 of the case. The cooling oil discharged through overflow ports 506 and 508 penetrates to the space between the upper portion 510 and the stator core. Thus, thermal resistance from the core to the case is lowered than when the space is filled with air.

Figure 20:
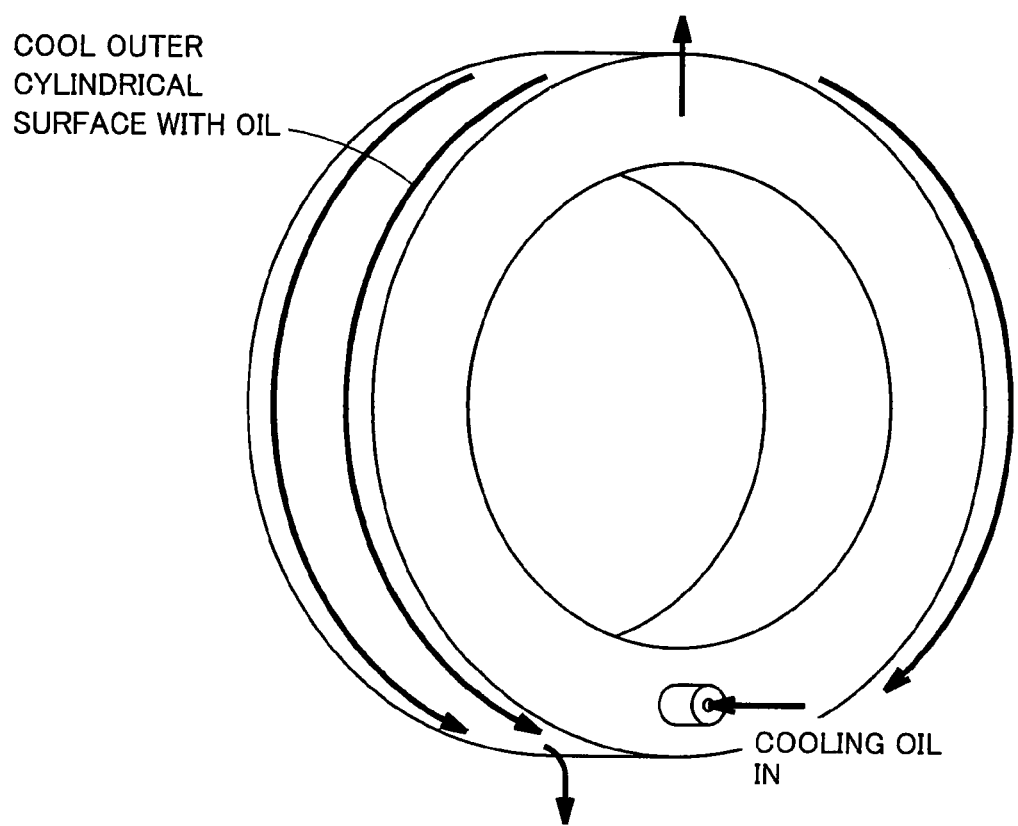
FIG. 20 illustrates flow of oil discharged from the overflow port.

FIG. 20 illustrates the flow of oil discharged from the overflow port.

As shown in FIG. 20, the cooling oil discharged from overflow port 506 or 508 falls down because of gravitation, along the outer cylindrical surface of the resin mold. In stator 500 in accordance with Embodiment 8, coil winding portions are partially exposed from the outer surface of the mold as shown in FIG. 3. Further, a groove is provided by forming the mold with a recessed cross-section at the time of injection molding, and the groove is closed by the cover, so that an oil flow passage of a closed structure is provided. It is preferred that an O-ring or a gasket is provided between the mold and the cover for sealing.

Further, by molding, a cutout shape is formed at an upper side along the direction of gravitation on the mold, and the oil is discharged therefrom. The cutout may be formed in the cover portion.

Further, by setting the outer diameter of the cover to be larger (>) than the outer diameter of the resin mold, the overflown cooling oil is reliably caused to flow over the outer cylindrical surface of the mold as shown in FIG. 20.

When the cooling oil is supplied from the lower portion in the direction of gravitation, the exposed portions of coils are fully immersed in the cooling oil, and the cooling oil overflows from the cutout of the mold at the upper portion in the direction of gravitation.

Part of the overflown cooling oil fills the space between the core and the case by capillary action, and remaining part falls down, cooling the outer cylindrical surface of the mold as shown in FIG. 20. At the cooling oil supply port, it is preferred to provide a check valve 404 formed of a ball and a spring, such as shown in FIGS. 17 and 18, to keep the exposed portions of the coils in the state dipped in the cooling oil even when the cooling oil supply pump (not shown) is in a stopped state.

A protruding member or members may be formed, at the time of molding, on the resin portion formed by molding, so that the cooling oil covers the coils as uniformly as possible and an area for heat transfer between the coil and the cooling oil is increased.

Further, dependent on the required level of cooling performance, it is sufficient to form the flow passage such that the oil flows close to the coils, without providing exposed, bare portions of the coils.

In the conventional structure, the heat from the outer cylindrical surface of the mold has been transferred through the air and, therefore, high effect of heat radiation could not have been expected. Here, however, the heat is radiated from the mold to the case by heat transfer through the cooling oil, not through the air. Thus, the effect of heat radiation from the outer cylindrical surface of the mold can be about tenfold higher than through the air. Thus, efficient cooling of the motor becomes possible.

Further, as the overflown cooling oil is supplied between the core and the case, heat resistance between the core and the case is significantly reduced. Thus, when the coil generates heat, the quantity of heat radiated through the path from the core to the case is increased. Thus, the coil temperature can be kept low. The heat resistance can be reduced to one-fifth, and about fivefold higher effect of heat radiation can be expected than when the space between the core and the case is filled with air.

Further, as the passage for supplying oil to the space between the core and the case is unnecessary, the case structure can be made simple (conventionally, some cases are provided with oil supply passage for better heat transfer between the core and the case; by providing such a flow as shown in FIG. 20, similar effects can be expected even when the case structure is simplified).

Although the present invention has been described and illustrated in detail, it is clearly understood that the same is by way of illustration and example only and is not to be taken by way of limitation, the spirit and scope of the present invention being limited only by the terms of the appended claims.

The invention claimed is:

1. A rotating electric machine, comprising:
   a stator core;
   a coil wound around said stator core; and
   a resin mold portion fixing said coil on said stator core, wherein
   said resin mold portion molds said coil such that a part of a coil end portion axially extends beyond part of an outside surface of the resin mold portion and is exposed and a remaining part of the coil end portion is covered with the resin mold portion,
   the coil end portion, which is a part of the coil wound around the stator core, protrudes from the stator core in a direction along a rotating shaft, and
   said rotating electric machine further comprises a cover forming, with said resin mold portion, a cooling flow passage arranged such that said coil end portion is dipped in a fluid for cooling.

2. The rotating electric machine according to claim 1, wherein
   in said cooling flow passage, a fluid supply port is provided on a lower side of said stator core, and a fluid discharge port is provided on an upper side of said stator core.

3. The rotating electric machine according to claim 2, further comprising
   a check valve attached to said fluid supply port.

4. The rotating electric machine according to claim 2, wherein
   said fluid discharge port is provided at a position allowing said fluid discharged from said fluid discharge port to be fed to a space between said stator core and a case accommodating said stator core.

5. The rotating electric machine according to claim 1, wherein part of the resin mold portion is located between the stator core and the coil.

6. The rotating electric machine according to claim 1, wherein the resin mold portion contacts the stator core and the cover.

* * * * *